US012003550B2

(12) United States Patent
Lyon et al.

(10) Patent No.: US 12,003,550 B2
(45) Date of Patent: *Jun. 4, 2024

(54) RESOURCE PROTECTION AND VERIFICATION WITH BIDIRECTIONAL NOTIFICATION ARCHITECTURE

(71) Applicant: ICE Mortgage Technology, Inc., Atlanta, GA (US)

(72) Inventors: Mike Lyon, Sterling Heights, MI (US); Frank Riviera, Rochester Hills, MI (US)

(73) Assignee: ICE Mortgage Technology, Inc., Atlanta, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/883,103

(22) Filed: Aug. 8, 2022

(65) Prior Publication Data

US 2022/0382897 A1 Dec. 1, 2022

Related U.S. Application Data

(63) Continuation of application No. 16/405,889, filed on May 7, 2019, now Pat. No. 11,412,003.

(60) Provisional application No. 62/844,667, filed on May 7, 2019, provisional application No. 62/667,943, filed on May 7, 2018.

(51) Int. Cl.
*H04L 9/40* (2022.01)
*G06F 9/50* (2006.01)
*G06F 16/245* (2019.01)
*G06F 21/62* (2013.01)

(52) U.S. Cl.
CPC .......... *H04L 63/205* (2013.01); *G06F 9/5033* (2013.01); *G06F 16/245* (2019.01); *G06F 21/6218* (2013.01); *H04L 63/10* (2013.01)

(58) Field of Classification Search
CPC ....... H04L 63/10; H04L 63/107; H04L 63/20; H04L 63/205; G06F 16/245
See application file for complete search history.

(56) References Cited

U.S. PATENT DOCUMENTS

| 8,332,495 B2 * | 12/2012 | Lancaster | ............... H04L 63/20 370/254 |
|---|---|---|---|
| 11,412,003 B1 | 8/2022 | Lyon et al. | |
| 2005/0210249 A1 | 9/2005 | Lee et al. | |

(Continued)

*Primary Examiner* — Daniel B Potratz
(74) *Attorney, Agent, or Firm* — DLA Piper LLP (US)

(57) ABSTRACT

A method of verifying resource protection statuses for resources for address-based resources may include receiving a request for verification of resource protection from a client device for an address-based resource. The request includes an address of a resource. The intermediate system is programmed to receive resource protection verification requests from a plurality of client devices, and to receive resource protection verifications from a plurality of resource protection systems that are in communication with the intermediate system. The method also includes determining that none of the resource protection systems in the plurality of resource protection systems currently protect the resource; retrieving information that is securely stored for the resource and a user associated with the request; and sending the information to one or more of the plurality of resource protection systems as a request to protect the resource.

20 Claims, 19 Drawing Sheets

(56) References Cited

U.S. PATENT DOCUMENTS

| | | | |
|---|---|---|---|
| 2010/0131757 A1 | 5/2010 | Orrell et al. | |
| 2010/0154025 A1* | 6/2010 | Esteve Balducci | H04L 63/20 726/1 |
| 2012/0198511 A1* | 8/2012 | Sarferaz | G06F 21/00 726/1 |
| 2014/0282586 A1 | 9/2014 | Shear et al. | |
| 2016/0364553 A1* | 12/2016 | Smith | H04L 63/0435 |
| 2018/0124090 A1* | 5/2018 | Koren | H04L 63/1416 |

\* cited by examiner

No Current Resource Protection Found

Protection Available at the Following:

| | |
|---|---|
| http://www.server1.io | 125446 |
| http://www.iighf.com | 3345 |
| http://www.lancer11.org | 85345 |
| http://www.555444.com | 063232 |
| http://www.server2.io | 12 |
| http://www.42linkk7.xom | 1245 |

RESOURCE PROTECTION AND VERIFICATION WITH BIDIRECTIONAL NOTIFICATION ARCHITECTURE

CROSS-REFERENCES TO RELATED APPLICATIONS

This application is a continuation of U.S. patent application Ser. No. 16/405,889 filed on May 7, 2019, which is incorporated herein by reference. U.S. patent application Ser. No. 16/405,889 claims the benefit of U.S. Provisional Application 62/667,943 filed on May 7, 2018, which is incorporated herein by reference. U.S. patent application Ser. No. 16/405,889 also claims the benefit of U.S. Provisional Application 62/844,667 filed on May 7, 2019, which is incorporated herein by reference.

TECHNICAL FIELD

This application discloses technology related to the fields of verifying the protection of a resource through a network session. In particular, this technology stores data subsets from multiple resource protection systems at a central server such that resource protection can be verified in real-time.

BACKGROUND

Resources can be protected by a number of different methods. Different standards and/or organizations may use different resource protection policies to guarantee that resources are adequately protected. Furthermore, a multitude of different resource protection systems may be available for general resource protection, and may be made available to resource owners through a network interface. These different resource protection systems may be spread across different servers operated by many different entities. Each of the resource protection systems and/or each of the particular protection policy employed by the systems may be individually tailored to particular resources or locations. Because each resource protection policy may be unique in at least a few respects, the methods of characterizing these protection policies and determining whether they meet external requirements for resource protection are as varied as the resource protection policies themselves.

Because of the relative importance of resource protection, some processes rely on the verification of a resource protection policy being in place before allowing a process to continue. When a process is initiated, the process may be paused in order to verify that an adequate resource protection policy is in place or any resources that may be accessed or affected by the process. Verifying that a resource protection policy is active requires the process to pause and send the communication request to the specific resource protection system currently employed to protect the resource.

SUMMARY

In some embodiments, a method of verifying resource protection statuses for resources for address-based resources may include receiving, by an intermediate system, a request for verification of resource protection from a client device for an address-based resource. The request may include an address of a resource. The intermediate system may be programmed to receive resource protection verification requests from a plurality of client devices, and to receive resource protection verifications from a plurality of resource protection systems that are in communication with the intermediate system. The method may also include determining, by the intermediate system, that none of the resource protection systems in the plurality of resource protection systems currently protect the resource; retrieving, by the intermediate system, information that is securely stored for the resource and a user associated with the request; and sending, by the intermediate system, the information to one or more of the plurality of resource protection systems as a request to protect the resource.

In some embodiments, a system may include one or more processors and one or more memory devices comprising instructions that, when executed by the one or more processors, cause the one or more processors to perform operations including receiving, at an intermediate system, a request for verification of resource protection from a client device for an address-based resource. The request may include an address of a resource. The intermediate system may be programmed to receive resource protection verification requests from a plurality of client devices, and to receive resource protection verifications from a plurality of resource protection systems that are in communication with the intermediate system. The operations may also include determining, by the intermediate system, that none of the resource protection systems in the plurality of resource protection systems currently protect the resource; retrieving, by the intermediate system, information that is securely stored by the intermediate system for the resource and a user associated with the request; and sending, by the intermediate system, the information to one or more of the plurality of resource protection systems as a request to protect the resource.

In any embodiments, one or more of the following features may be implemented in any combination and without limitation. The intermediate system may act as an intermediary to decouple requests from client devices from requests sent to the plurality of resource protection systems. The intermediate system may include a cloud-based system that operates on hardware and software that is different from any of the plurality of resource protection systems. The address of the resource may include a physical location of the resource. The method/operations may also include sending, by the intermediate system, an indication to the client device that the resource is currently unprotected; and receiving, by the intermediate system, an indication from the client device that protection for the resource should be requested. The indication from the client device that the resource is currently unprotected may include a list of one or more resource protection systems from the plurality of resource protection systems. An order of the list of one or more resource protection systems may be determined based on a predetermined priority level for each of the one or more resource protection systems. An order of the list of one or more resource protection systems may be determined based on a preference indicated by the user. The method/operations may also include receiving, by the intermediate system, a second request for verification of resource protection from a second client device for a second address-based resource; determining, by the intermediate system, that one or more of the resource protection systems in the plurality of resource protection systems currently protect the resource; sending an transmission to the one or more of the resource protection systems indicating that the resource is being transferred to the user from a previous user. Information that is securely stored by the intermediate system may include contact information for the user and the address of the resource. The method/operations may also include authorizing, by the intermediate system, the plurality of resource protection systems that provide protection for a plurality of different resources to provide periodic uploads to the intermediate system; receiving, by the intermediate system, periodic uploads of information associated with protected resources from the plurality of resource protection systems, where the information associated with the protected resources may include data subsets of full data sets stored at the plurality of resource protection systems; and storing the data subsets in a database at the intermediate system. Determining, by the intermediate system, that none of the resource protection systems in the plurality of resource protection systems currently protect the resource may include using the address of the resource, querying the database for a data subset associated with protection of the resource. The method/operations may also include receiving an estimate of a data value for resource protection from one or more resource protection systems in the plurality of resource protection systems; and sending the estimate of the data value to the client device. The method/operations may also include generating an estimate of a data value for resource protection, where the estimate may be based at least in part on data values received from the resource protection systems; and sending the estimate of the data value to the client device. The method/operations may also include sending a second request based on the request for verification of resource protection to a subset of the plurality of resource protection systems, where the second request may be sent in response to receiving the request for verification of resource protection. The method/operations may also include reformatting the request for verification of resource protection into a standard format for an API used by the plurality of resource protection systems and specified by the intermediate system. An indication of resource protection received from one of the plurality of resource protection systems may include a protection start time and a protection interval. The information that is securely stored by the intermediate system for the resource and the user associated with the request may be used to populate a form.

In some embodiments, a method of efficiently storing and retrieving subsets of resource protection information for low-latency retrieval may include authorizing a plurality of resource protection systems that provide protection for a plurality of different resources to provide periodic uploads, and receiving periodic uploads of information associated with protected resources from the plurality of resource protection systems. The information associated with the protected resources may include data subsets of full data sets stored at the plurality of resource protection systems. The method may also include storing the data subsets in a database, and receiving a request for verification of resource protection from a requesting system. The request for verification of resource protection may request at least one data value, and may include an address of a resource. The method may additionally include, using the address of the resource, querying the database for a data subset associated with protection of the resource, and returning at least a portion of the data subset to the requesting system. The at least a portion of the data subset may include the at least one data value, and an identification of one of the plurality of resource protection systems that provides protection for the resource.

In some embodiments, a system may include one or more processors, and one or more memory devices that my include instructions that, when executed by the one or more processors, cause the one or more processors to perform operations including authorizing a plurality of resource protection systems that provide protection for a plurality of different resources to provide periodic uploads, and receiving periodic uploads of information associated with protected resources from the plurality of resource protection systems. The information associated with the protected resources may include data subsets of full data sets stored at the plurality of resource protection systems. The operations may also include storing the data subsets in a database, and receiving a request for verification of resource protection from a requesting system. The request for verification of resource protection may request at least one data value, and may include an address of a resource. The operations may additionally include, using the address of the resource, querying the database for a data subset associated with protection of the resource, and returning at least a portion of the data subset to the requesting system. The at least a portion of the data subset may include the at least one data value, and an identification of one of the plurality of resource protection systems that provides protection for the resource.

In any embodiments, one or more of the following features may be implemented in any combination and without limitation. The database may store data subsets from the plurality of resource protection systems indexed at least in part by addresses of the associated resources. The at least a portion of the data subset may further include a time interval associated with the protection of the resource. Querying the database for the data subset associated with protection of the resource may include determining that there is no entry in the database associated with the resource, submitting a query to at least one of the resource protection systems, and receiving an estimate of the at least one data value from the at least one of the resource protection systems. The method/operations may also include generating an estimate based at least in part on the received estimate of the at least one data value from the at least one of the resource protection systems. Querying the database for the data subset associated with protection of the resource may include determining that there is no entry in the database associated with the resource, and generating an estimate of the at least one data value. Generating the estimate of the at least one data value may be based at least in part on data subsets stored in the database having addresses that are within a predetermined range of the address of the resource. Generating the estimate of the at least one data value may be based at least in part on data subsets stored in the database having resources with characteristics that are similar to characteristics of the resource. The method/operations may also include receiving a subsequent request for a full data set for the resource, submitting a query to a resource protection system indicated by an entry in the data subset for the resource stored in the database, receiving the full data set for the resource from the resource protection system, and returning the full data set to the requesting system. The method/operations may also include generating a statistical comparison between the at least one data value and other data values stored in the database, and sending an indication of the statistical comparison to the one of the plurality of resource protection systems. The method/operations may also include sending an indication to the one of the plurality of resource protection systems in response to receiving the request for verification of resource protection from the requesting system, where the indication may include the address of the resource. The method/operations may also include sending an indication to the requesting system, where the indication may include an identification of the one of the plurality of resource protection systems.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 15 illustrates an interface that may be generated on a client device for requesting resource protection when it cannot be verified, according to some embodiments.

DETAILED DESCRIPTION

Figure 1:
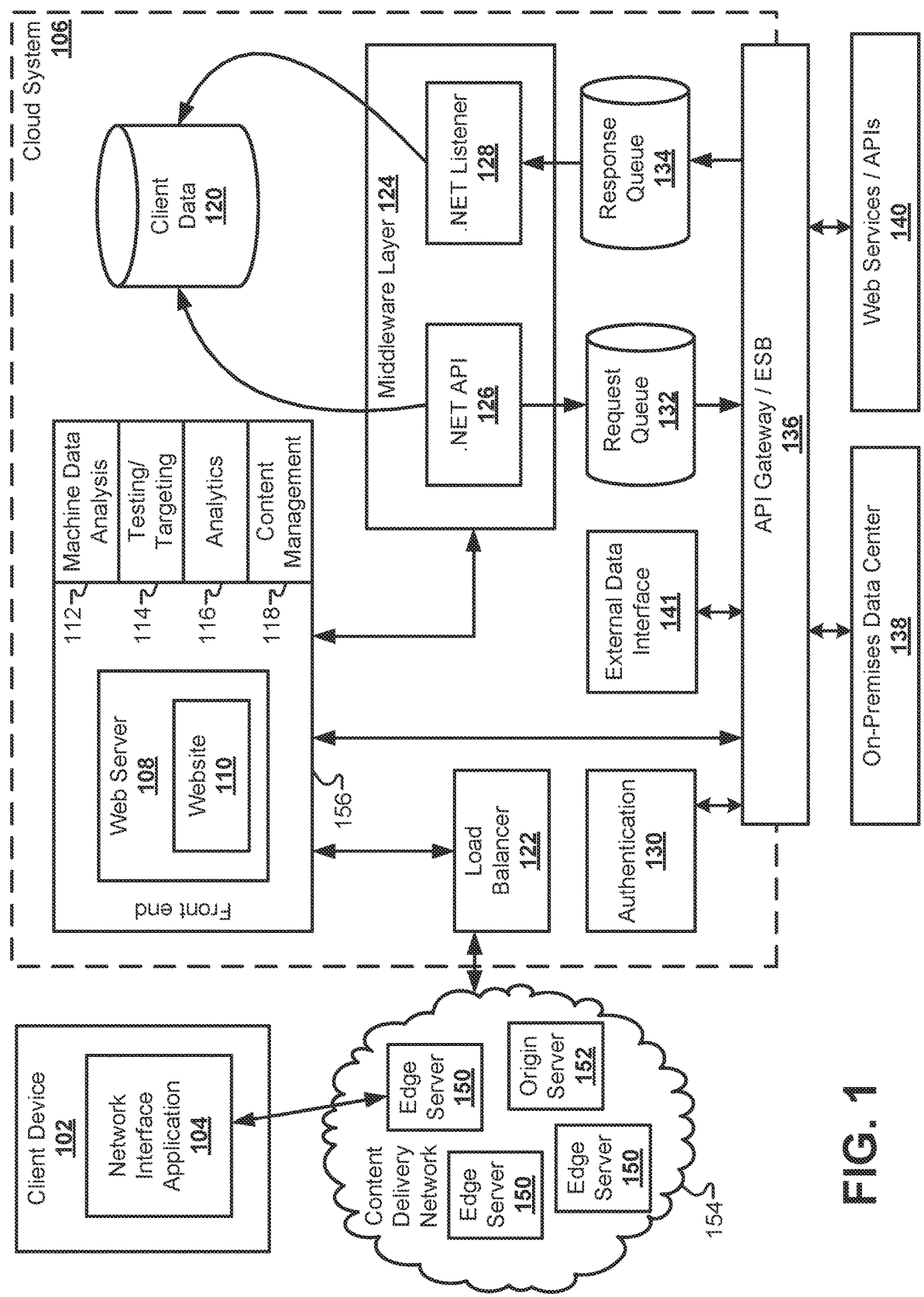
FIG. 1 illustrates a block diagram of a cloud system for receiving, importing, validating, and augmenting client data, according to some embodiments.

Described herein is a novel server technology to facilitate verifying the details of a resource protection policy in real-time. A requesting system, such as a cloud-based system described below, can initiate a process that depends on the protected resource. At a first point during the process, the cloud-based system can pause the process and send a request communication to a resource protection verification server ("verification server"). The verification server can then query an internal database that stores data subsets describing resource protection policies implemented for various resources. For example, the cloud-based system can provide a resource address to the verification server, and the verification server can use the resource address to query the subset database to retrieve information regarding the resource protection policy. Instead of storing the entire resource protection policy, the subset database can store a subset of the protection policy information. Instead of querying the individual resource protection systems responsible for each resource, the verification server can periodically receive a subset upload from each of the resource protection systems that subscribe to the verification server. For example, each night, the resource protection systems can upload data subsets for each resource protection policy administered by the resource protection system. The subsets may include only a portion of the information describing the resource protection policies, and thus the subset database can efficiently store protection policy information for millions of resources in a memory-efficient manner. Because the information is stored locally, the verification server can respond to the cloud-based system after querying the subset database, and the entire transaction can be completed in real time without a significant delay. The subset of information provided by the verification server can act as a verification that the resource protection policy is active, and the process executing at the cloud system can be allowed to continue executing.

At a second point in the process, the cloud-based system can again cause the process to pause as additional details regarding the resource protection policy are required for continued execution. Again, the cloud-based system can send a request to the verification server to retrieve a full data set related to the resource protection policy. In some embodiments, the full data set related to the resource protection policy may be stored locally at the verification server. In some embodiments, the verification server may include a plurality of APIs that are specially tailored for each of the external resource protection systems. The verification server can reach out to these APIs and retrieve full data sets of information for an existing resource protection policy. The verification server may include an event hub and a stream analytics module that analyze the traffic going back and forth between the requesting systems (e.g., the cloud-based system) and the resource protection systems. The event hub can monitor individual communications and send notifications to both the requesting systems and the resource protection systems to help ensure that the resource protection policy under the current resource protection system continues uninterrupted. The event hub can also generate notifications to the requesting system when a different resource protection system can provide a better resource protection policy for a particular resource. Additionally, the event hub can monitor data as it passes through the verification server in the aggregate, such that the population of resource protection policies can be analyzed to generate notifications for the resource protection systems to help improve resource protection policy implementation.

Before describing the novel technology of the resource protection verification server, this disclosure will discuss a cloud-based system coupled with an on-premises system, each of which can act as a requesting system for the resource verification server. The cloud-based system and the on-premises system described below are provided merely by way of example and are not meant to be limiting. However, they do provide examples of processes that may rely on resources and that may require verification of an operating resource protection policy available through a network. FIGS. 1-6 describe such processes that may operate on such requesting systems. FIGS. 7-14 then describe the technology of the resource protection server.

FIG. 1 illustrates a block diagram of a cloud system 106 for receiving, importing, validating, and augmenting client data, according to some embodiments. The client data collection process may begin with a client device 102 accessing the web server 108. The client device 102 may include a laptop computer, a desktop computer, a smart phone, a PDA, a tablet computer, a workstation, a voice-activated device or personal assistant, a watch, and/or the like. The client device 102 may be operated by a user to explore various data set options that may be available through the cloud system 106. The client device 102 may include a software application that acts as a network interface application 104 to parse and display data sent from the web server 108 and send information from the user. Depending on the particular hardware of the client device 102, the network interface application 104 may include a web browser operating on a desktop computer, an app operating on a smart phone, a voice recognition application operating on a control device, including the Google Home® or the Amazon Alexa®.

The client device 102 may communicate through a network, such as a local area network (LAN), a wide-area network (WAN), the Internet, and so forth. In the embodiment of FIG. 1, the cloud system 106 may provide content to the network interface application 104 via a content delivery network (CDN) 154. The CDN may include a plurality of edge servers 150 and at least one origin server 152 to store and distribute cached copies of the website 110 provided by the web server 108. The website 110 may include programming code, such as JavaScript, that provides front-end functionality to the website 110 when interacting with the client device 102. For example, the website 110 can collect client data that may be used to generate a result set by walking the user through a series of web forms. The client data may include information descriptive of the user, such as identification numbers. The website 110 can also use information supplied by the client device 102 to solicit information from third-party services through various APIs and/or web service interfaces. An example of a progression of web forms that collect information needed to recommend and/or approve a result set for the user is described in greater detail below. The client data may be provided in one or more data packets transmitted from the client device 102.

The CDN 154 can provide local copies of the website 110 to the client device 102 from an edge server 150 that is closer in proximity to the client device 102 than the web server 108 itself. One of the problems solved by the embodiments described herein involves the speed with which result sets can be provided and updated on the display of the client device 102. The architecture illustrated in FIG. 1 is specifically designed to increase the speed with which these results can be displayed on the client device 102 from a hardware perspective.

The website 110 is used only as an example of one of the ways that the cloud system 106 can interact with the client device 102. Therefore, this disclosure should not be limited to a website per se. Instead, the term website 110 throughout this disclosure may be replaced with any user interface capable of receiving data from the client device 102 and transmitting data to the client device. For example, another embodiment can provide a voice activated, audio interface for communicating with client devices through voice services such as Alexa® by Amazon®. Another embodiment can use an entertainment dashboard in a vehicle as an interface for communicating with the client device 102. Similarly, the web forms presented through the website 110 are also used as an example that is specific to the website 110 environment. In this disclosure, the term web form may be replaced with any sort of digital form that can present and receive information to a user through the network interface application 104. For example, the form could include interactive user interface elements displayed in an application running on a smart phone or smart watch. In another example, the form may include audio provided to a user and audio received from a user in a voice-activated user interface. Therefore, the terms "website" and "web form" are merely exemplary and not meant to be limiting.

The cloud system 106 may include a load balancer 122 that receives Internet traffic that may include client data provided from the client device 102. As used herein, the term "client data" may include any information received from the client device 102. For example, client data may include numerical values, data fields, estimates, identification numbers, addresses, user account identifiers, and so forth. As described in greater detail below, the client data received from the client device 102 may be augmented with information received from third-party web services and/or application programming interfaces (APIs). The client data may also be verified or validated using third-party validation interfaces that are external to the cloud system 106.

The cloud system 106 may include hardware elements that may be electrically coupled via a bus. The hardware elements may include one or more central processing units (CPUs), one or more input devices (e.g., a mouse, a keyboard, etc.), and one or more output devices (e.g., a display device, a printer, etc.). The cloud system 106 may also include one or more storage devices. By way of example, storage device(s) may be disk drives, optical storage devices, solid-state storage device such as a random access memory ("RAM") and/or a read-only memory ("ROM"), which can be programmable, flash-updateable and/or the like.

The cloud system may additionally include a computer-readable storage media reader, a communications system (e.g., a modem, a network card (wireless or wired), an infra-red communication device, etc.), and working memory, which may include RAM and ROM devices as described above. In some embodiments, the cloud system 106 may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with the network and/or any other computer described below with respect to the cloud system 106.

The cloud system 106 may also comprise software elements, shown as being currently located within a working memory, including an operating system and/or other code, such as an application program (which may be a client application, web browser, mid-tier application, RDBMS, etc.). It should be appreciated that alternate embodiments of a cloud system 106 may have numerous variations from that described above. For example, customized hardware might also be used and/or particular elements might be implemented in hardware, software (including portable software, such as applets), or both. Further, connection to other computing devices such as network input/output devices may be employed. Software of cloud system 106 may include code for implementing various embodiments as described herein.

The Web server 108 may be part of a front end 156 posted by the cloud system 106. The front end 156 may additionally include other hardware and/or software components that quantify the performance of the Web server 108. Some embodiments may include a content management system (CMS) 118 to support the creation and/or modification of digital content that is presented by the Web server 108 to the client device 102. Some embodiments may include an analytics component 116, such as a customer experience management (CEM) system that captures and analyzes the details of the experience of the user of the client device 102. Some embodiments may include a testing and targeting component 114 used to target specific users with specific content. Some embodiments may also include a gr data analysis component 112 that searches, monitors, and analyzes machine-generated big data via a web interface by capturing/indexing/correlating real-time data in a searchable repository to generate reports, graphs, and other visualizations. These components 112, 114, 116, 118 can be used by the cloud system 106 to analyze the effectiveness of the content provided by the website 110 over time.

The cloud system 106 may also include a middleware layer 124 that acts as an interface between the front end 156 and other data systems in the cloud system 106. The middleware layer 124 may perform application integration, data integration, and handle messages passed back and forth between the cloud system 106 and an on-premises data center 138 and other external systems. In the embodiment of FIG. 1, the middleware layer 124 may include an API 126 and a listener 128 for generating and receiving responses from various systems. For example, the middleware layer 124 can communicate with a client data database 120 that securely stores client data received from the client device 102. The client data database 120 can be used in conjunction with other off-cloud databases to store client data between web sessions for a particular user. The middleware layer 124 can also interface with a request queue 132 and a response queue 134 of the cloud system 106. The request queue 132 can store messages passed from the middleware layer 124 to other systems both inside and outside the cloud system 106. Similarly, the response queue 134 can receive messages passed from other systems to the middleware layer 124.

Some of the external systems that interface with the cloud system 106 may include the on-premises data center 138 and one or more Web services and/or APIs 140. To interface with these external systems, the cloud system 106 may include an API Gateway or Enterprise Service Bus (ESB) to provide a central point for managing, monitoring, and accessing exposed Web services. Data can be passed from the middleware layer 124 to the API Gateway/ESB 136 through the request queue 132 and/or the response queue 134. Additionally, the front end 156 may communicate directly with the API Gateway/ESB 136.

To collect the client data from the client device 102, the website 110 may present a series of dynamic web forms to the network interface application 104. Before, during, and/or after this process of collecting client data begins, the cloud system 106 may require the user to establish a user account with the cloud system 106. Some embodiments may include an authentication module 130 that authenticates an identity of a user of the client device 102. The authentication module 130 may communicate with the data center 138 through the API Gateway/ESB 136.

The presentation of web forms may include a type of web form that allows the client device 102 to submit data provided by the user. The web form can receive data from the user that may require some form of verification before it is used in the selection of a data set or the generation of a result set. Prior to this disclosure, such data verification could take days or even weeks to perform. This generally discouraged users from completing the web session and generating a client data packet. To solve this and other problems, the embodiments described herein may use an external data interface 141 to verify the client data provided from the client device 102. The external data interface 141 may, for example, retrieve a history of data values from other computer systems that can be used to generate an estimate of certain fields in the web form provided by the user. For example, the external data interface 141 may provide a verified value to the cloud system 106, and the data provided from the client device 102 may be verified if that data falls within a predetermined range of the verified value. This data verification step allows for greater accuracy and reliability when selecting candidate data sets and generating result sets for the client device 102.

The external data interface 141 may also retrieve data that can be used to supplement and/or correct information provided from the client device 102. Depending on the complexity of the web session, some users may be unwilling to manually enter all of the client data requested by the website 110. Other users may enter incorrect information accidentally or purposefully. The external data interface 141 provides an alternative to previous systems that required the user to manually provide all current data through the client device 102. Instead, the external data interface 141 can select at least a portion of the current data provided to the web form to automatically download a portion of the current data from the external data interface 141. For example, instead of manually typing current data values into the web form, the cloud system 106 can instead use a user identifier and/or user credentials to download a portion of the current data automatically through the external data interface 141. This process can decrease the amount of time required for the user to progress through the plurality of web forms, and can reduce user-injected errors into the client data. Information may be imported from the external data interface 141 as data packets. The external data interface 141 may access a third-party computer system that provides the imported data. After the client data is collected from the client device 102 and optionally supplemented/verified by data from the external data interface, the system can use the client data to generate a solution that includes one or more result sets.

Figure 2:
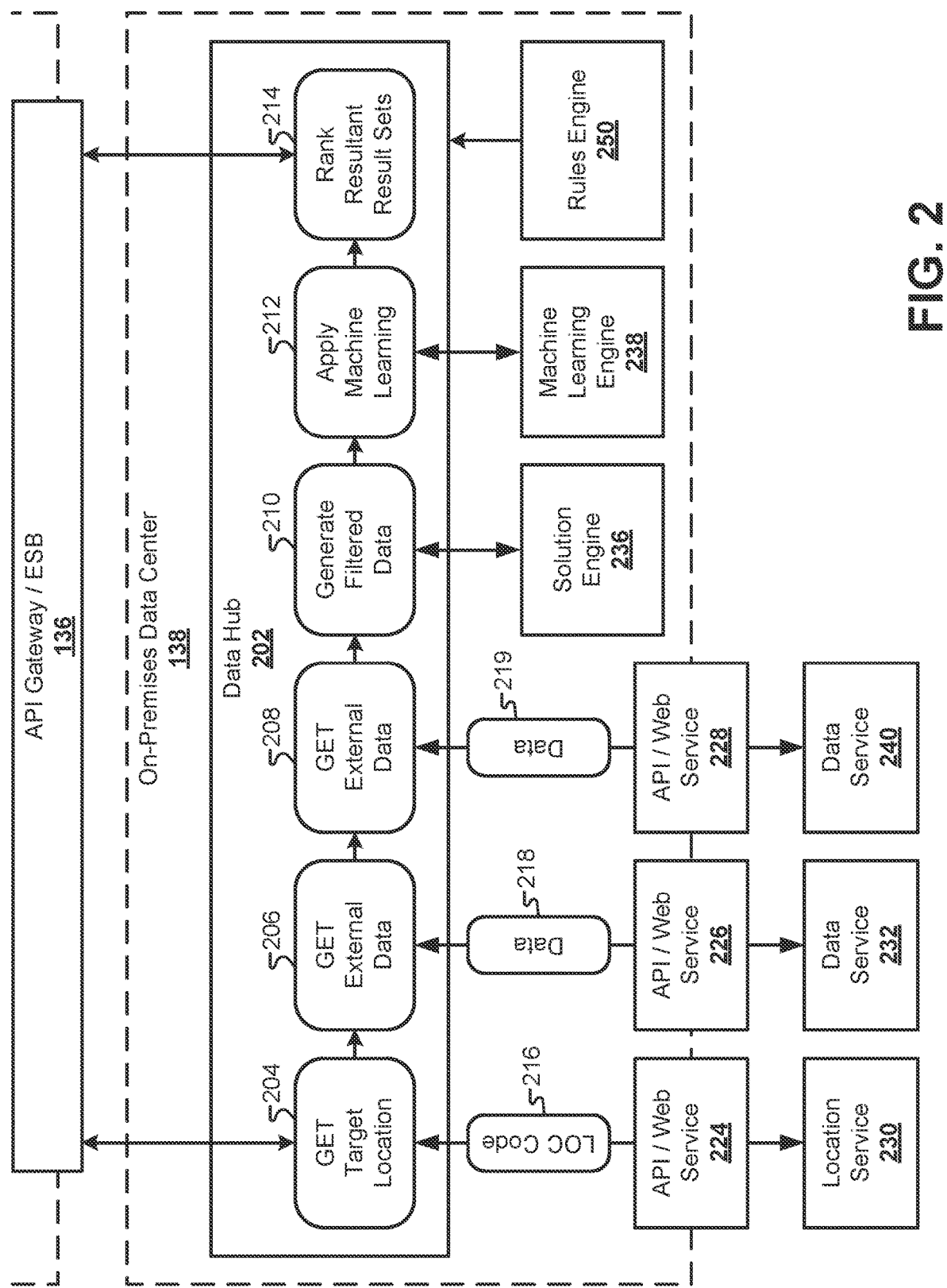
FIG. 2 illustrates a block diagram of a data center that may be used in conjunction with the cloud system, according to some embodiments.

FIG. 2 illustrates a block diagram of a data center 138 that may be used in conjunction with the cloud system 106, according to some embodiments. In this embodiment, the cloud system 106 may be separate from the data center 138. For example, the data center 138 may be physically hosted by an entity that generates the result sets to the client device 102, while the cloud system 106 may be hosted by a cloud service provider that is different from the entity providing the data center 138. However, in other embodiments, the functionality provided by the data center 138 may also be located in the cloud system 106. Some embodiments may duplicate the functions described below for the data center 138 in both the cloud system 106 and the data center 138. Therefore, the bifurcation of the system between FIG. 1 and FIG. 2A is done by way of example and not meant to be limiting. Other embodiments may divide the functionality described herein between the cloud system 106 and the data center 138 in any combination of functions without limitation. In another embodiment, the architecture of FIG. 2 may have the software/hardware components from the data center 138 instead located in the cloud system 106.

The data center may include various databases that store client data, along with systems that provide content for the cloud system 106. To generate solutions based on the received client data, the data center 138 may include a data hub 202 that receives a packet of client data from the cloud system 106 and generates one or more result sets that are transmitted back to the cloud system 106. The data hub 202 may act as a central accumulator of the client data that finalizes the client data packet for generating a solution. Specifically, the data hub 202 may be made up of a plurality of processes that augment, format, filter, and process the client data in such a way that a solution engine 236 and a machine learning engine 238 can generate an optimal result set.

In some embodiments, the data hub 202 can augment the client data by executing a process 204 that requests a location code 216 from a location service 230 through an API/web service 224. The location code may designate a general geographic area to be associated with the client data. The data hub 202 may also include a process 206 that uses the location code retrieved from the location service 230 to retrieve rules or penalties 218 that may be applied to the candidate data sets based on location. The process 206 can send the location code through an API/web service 226 to a data service 232 specifically configured to provide such rules or penalties 218 for candidate data sets. These may include a cost that is applied to the data set based on the location from the location service 230. In some embodiments, a process 208 may retrieve additional data 219 from a data service 240 through an API/web service 228. The data 219 received from the data service 240 may include a rating for the user that may influence which particular candidate data sets that may be available to the user. The data service 240 may include a third-party service that provides a rating for the user that is based at least in part in some of the values provided in the client data from the user, as well as a previous history of the user.

After augmenting the client data, the data hub 202 can include a process 210 to generate a set of filtered data. As used herein, the term filtered data may refer to a specific subset of the augmented client data that is formatted for submission to the solution engine 236. The filtered data can be used by the solution engine 236 to filter out candidate data sets from a collection of available data sets that are not available to the user. For example, at this stage, the client data may include an exhaustive list of information that may be needed later by the system in future web sessions. However, much of the client data may not be needed at this stage of the process for filtering the collection of available data sets. Therefore, the process 210 can select a subset of the information in the client data, format the filtered data accordingly, and send the formatted subset of the client data to the solution engine 236. In response, the solution engine can provide a plurality of candidate data sets from the collection of available data sets for consideration by the data hub 202.

Next, the data hub 202 can select one or more optimal data sets from the plurality of candidate data sets through a process 212 that accesses a machine learning engine 238. The machine learning engine 238 can use additional information from the filtered and/or client data. For example, the solution engine 236 may provide a plurality of data sets that are available to the user based on the filtered client data. The machine learning engine 238 can select an optimal subset of the available data sets to be transmitted back to the client device 102. A process 214 can then rank the result sets by type and send the result sets to the cloud system 106 for transmission to the client device 102.

The data hub 138 may govern the overall process of collecting the client data, determining which, if any, portions of the client data are missing or invalid, and calling upon external services to augment the client data with additional information. For each field in the client data, a rules engine 250 can execute a validation rule to ensure that the client data is valid (e.g., "is the value of the rate field greater than 0.00?"). The rules engine 250 can also determine which external data services may be used to retrieve data that is missing from the client data packet. For example, a rating from an external rating service may be required before candidate data sets can be selected. If the rules engine 250 determines that the client data set is missing this rating, it can cause the process flow of the data hub 202 to make a request to the external rating service to retrieve a rating for the user. Overall, the rules engine 250 can orchestrate the process flow of the different processes 204, 206, 208, 210, 212, 214, etc., in the data hub 202.

Figure 3:
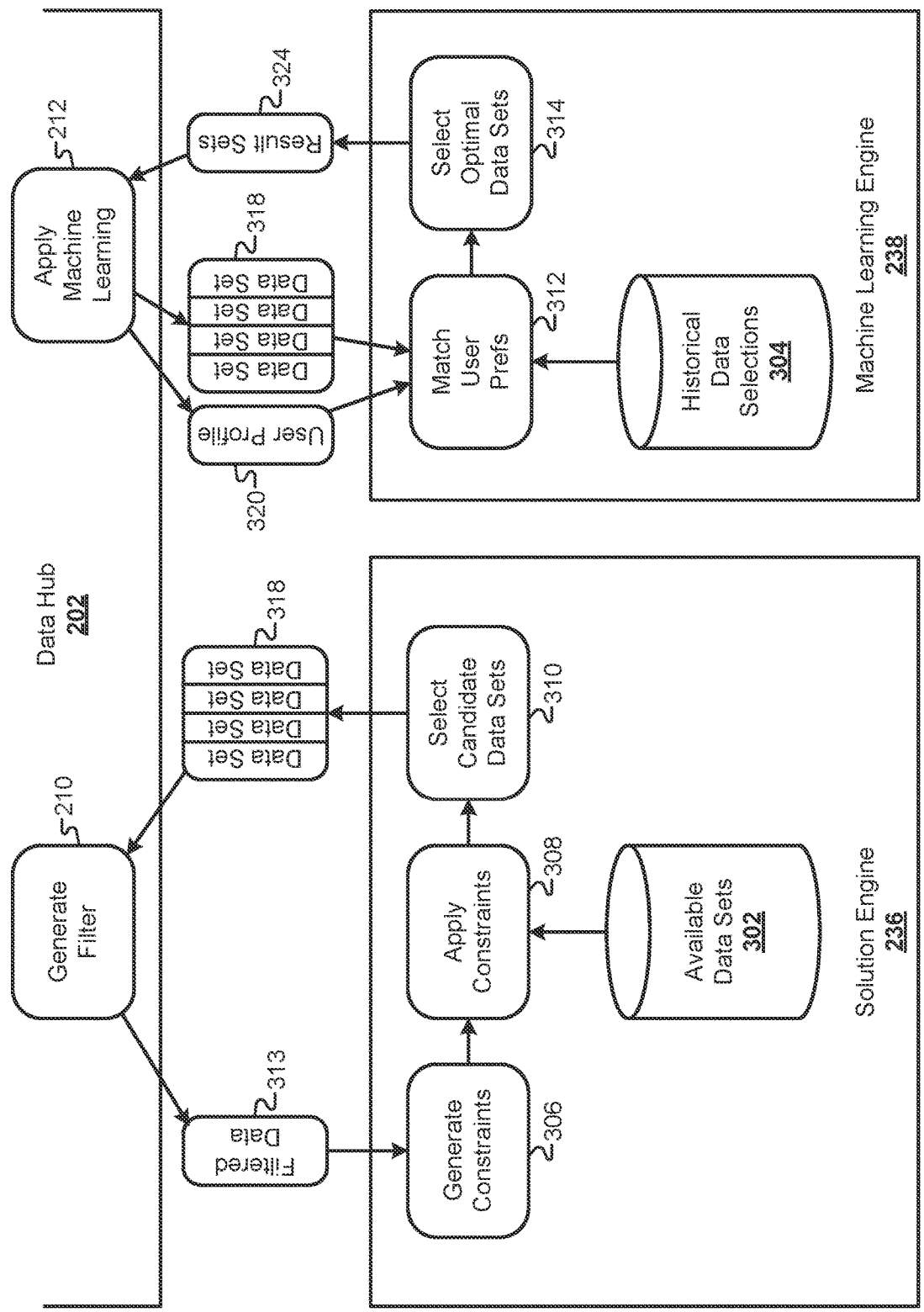
FIG. 3 illustrates a block diagram of how the solution engine and the machine learning engine generate result sets, according to some embodiments.

FIG. 3 illustrates a block diagram of how the solution engine 236 and the machine learning engine 238 generate result sets 324, according to some embodiments. The filtered data 313 can be passed to the solution engine 236, and process 306 can use the filtered data 313 to generate a plurality of rules and subsequent constraints to be applied to the available data sets. As described in greater detail below, the process 306 can use fields in the filtered data 313 to eliminate subsets of the available data sets, which can be expressed in constraints statements. For example, a determined data type may be used to eliminate certain data sets from the collection of available data sets. In some embodiments, the collection of available result sets may be categorized according to a type that may correspond to the data type in the filtered data 313. One or more constraint expressions may be constructed by the process 306 that would eliminate available data sets associated with that particular data type from the collection of available data sets for this particular set of filtered data 313.

After generating the constraints, the solution engine 236 can execute a process 308 that applies the constraint statements to the collection of available data sets. The collection of available data sets may be stored in a database 302, and may include thousands of different data set options. Data sets may be categorized based on a time interval, a rate, a source, and so forth. Data sets may also be categorized based on eligibility of the user based on augmented client data. In some embodiments, the constraint expressions can be applied in a single pass to each individual available data set; however, other embodiments may apply constraint expressions in multiple passes through the available data set. After the constraints are applied, a linear regression method 310 can be used to generate a set of candidate data sets 318. These candidate data sets may represent data sets for which the user may be eligible.

Next, the candidate data sets 318 can be provided to the machine learning engine 238. The machine learning engine can analyze the candidate data sets 318 and select one or more optimal data sets 314 from the candidate data sets 308. The machine learning engine 238 can use a collection of historical data selections 304 to determine the optimal data set(s) 314. For example, the client data provided by the user may be used to generate a user profile. The machine learning engine 238 can compare the user profile for this particular user to user profiles for previous web sessions associated with different users. The data set selections of previous users can then be used to determine which of the candidate data sets 318 would most likely be chosen by the current user.

For example, after each web session, the machine learning engine 238 can store the optimal data sets presented to each user, along with which of the optimal data sets was selected by each user in the collection of historical data selections 304. Additionally, the machine learning engine 238 can store the user profile derived from the augmented client data for each user with the selection information. When a new plurality of candidate data sets 318 is received for a new user, the augmented client data can be used to generate a similar user profile. For example, a set of values can be extracted from the augmented client data to generate a user profile 320. The user profile 320 can be matched to one or more historical user profiles. The final selections made by the users associated with the matched historical profiles can then be used to influence the selections made from the candidate data sets 318 for the current user. For example, if a number of previous users all selected certain types of optimal data sets that were presented, the previously selected optimal data sets can be ranked higher, based on this prior selection data. In essence, the machine learning engine 238 may use the expressed preferences of previous users to determine which of the candidate/optimal data sets are most likely to be selected by the current user.

Figure 4:
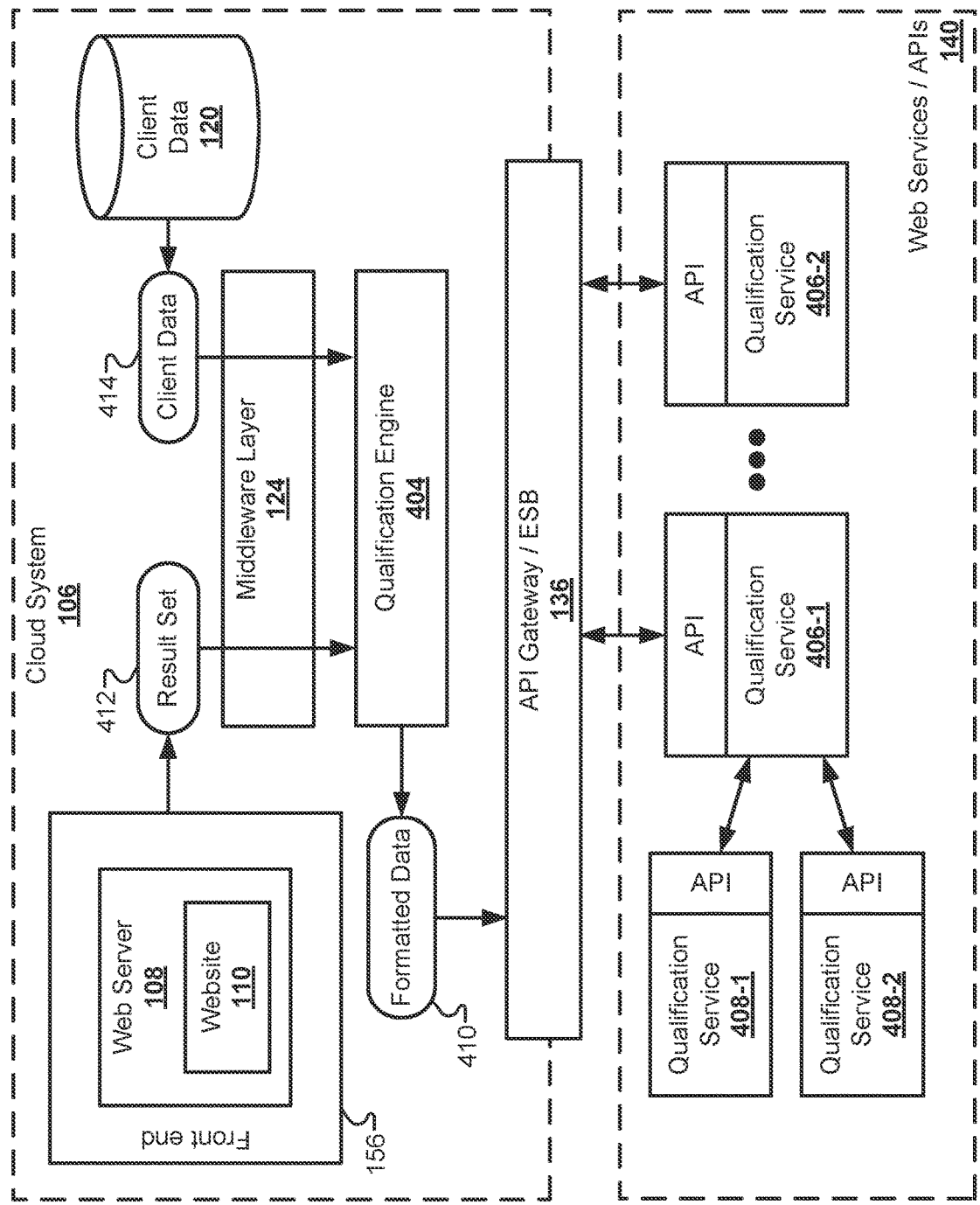
FIG. 4 illustrates a block diagram of the cloud system interacting with a plurality of qualification services, according to some embodiments.

FIG. 4 illustrates a block diagram of the cloud system 106 interacting with a plurality of qualification services 406, according to some embodiments. After the user has finalized the result set by adjusting values in the result set 324 through the web interface, the finalized result set 412 can be sent to a universal qualification engine 404 of the cloud system 106. The finalized result set 412 may include final values for the adjustable parameters that are set by the user, such as a final value for a rate field, a final value for a cost or penalty field, a final value for a time interval field, and so forth. Additionally, the client data that was collected, imported, augmented, and validated during the process described above may be stored in the client data database 120. The client data 414 may also be provided to the qualification engine 404.

After receiving the finalized rule set 412 and the client data 414, the qualification engine 404 can filter and/or combine data fields from the finalized result set 412 and the client data 414 to put together specific data packages that are required by each of the qualification services 406. Each qualification service 406 may require certain data points from the finalized result set 412 and/or the client data 414, and the qualification engine 404 can assemble data packages that match the requirements of each particular qualification service 406. Additionally, each qualification service 406 may require that each data packet be formatted according to specific requirements, such as a specific XML file format. The qualification engine 404 can format each data package according to the requirements of each particular qualification service 406.

Through the API Gateway/ESB 136, the qualification engine 404 can send data packages to one or more of a plurality of qualification services 406. Some qualification services 406 may be communicated with directly by the cloud system through a corresponding public API or web service interface. Secondary qualification services 408 may be accessible through another qualification service 406-1. In these cases, the data package can be formatted and selected based on the requirements of the qualification service 406-1, and a field or designator may be provided indicating that the qualification service 406-1 should send the request to a specific secondary qualification service, such as qualification service 408-2.

In some cases, each qualification service 406 may impose a penalty or cost on each submitted request. Therefore, it may be advantageous for the cloud system 106 to intelligently determine an order of precedence or ranking for the qualification services 406. When a plurality of qualification services are available, the cloud system 106 can rank each of the qualification services based on the criteria discussed below, then sequentially send requests to each of the qualification services 406 until an acceptable result has been returned. In some embodiments, the request may be sent simultaneously to each of the qualification services 406 without regard for a specific penalty for each. Instead, the system can analyze the results from each of the qualification services 406 to determine which of the results is most advantageous.

Figure 5:
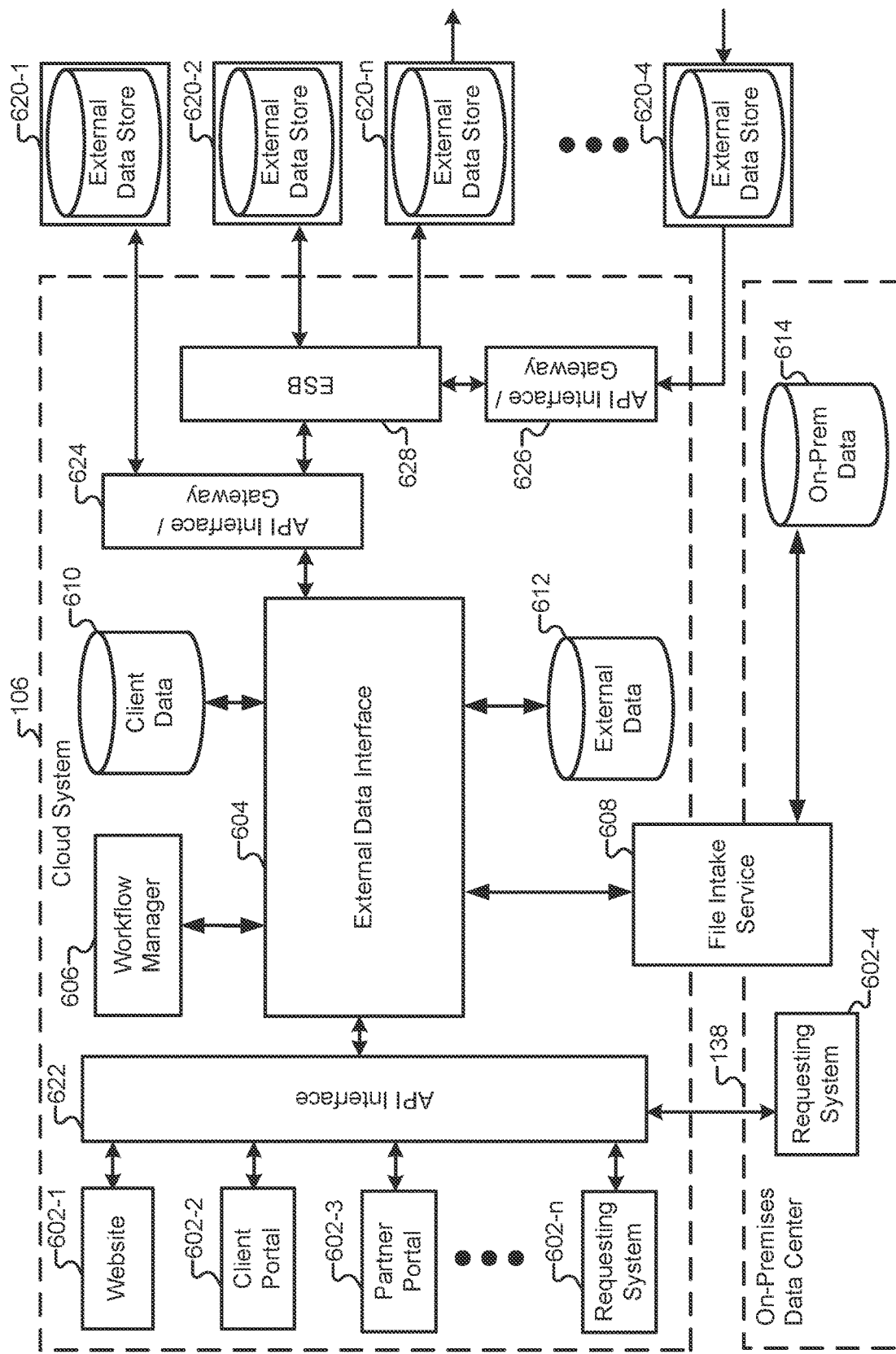
FIG. 5 illustrates an external data interface in the cloud system that can be used for extracting information from external data stores, according to some embodiments.

FIG. 5 illustrates an external data interface 604 in the cloud system 106 that can be used for extracting information from external data stores, according to some embodiments. As described above, the cloud system 106 may include a website 602-1. The website 602-1 can be used to initially collect information from the client device to begin the process described above. However, the website 602-1 may be just one of a plurality of possible requesting systems 602. These requesting systems 602 may include a client portal 602-2 allows client devices to access and edit their data sets after the process described above in FIGS. 1-4 to generate a final result set has been completed. The requesting systems 602 may also include a partner portal 602-3 that is a partner-facing web application used to feed client data to other systems. Some of the requesting systems 602 may be part of the same cloud system 106 as the external data interface 604. Alternatively or additionally, some of the requesting systems 602 may be part of the on-premises data center 138, such as requesting system 602-4. In other embodiments not explicitly shown in FIG. 5, some requesting systems 602 may also reside in other computing locations.

Together, the requesting systems 602 may be referred to herein as "internal" systems, in that they are internal to the cloud system 106 and/or the on-premises data center 138. This terminology can be used to differentiate the internal systems from the "external" data stores 620 that are being accessed. In some embodiments, the internal systems may all be operated by the same entity, whereas the external data stores 620 may each be operated by different entities. The internal systems also may be used for editing or collecting client device data from the client device for the process described above in FIGS. 1-4, whereas the external systems are used to supplement or verify information provided by the client device.

An API interface 622 may also be provided in the cloud system 106 to both identify and filter the requesting systems 602 (the internal systems) making requests, and to provide a uniform interface for each type of call that may be made to one of the external data stores 620. The API interface 622 can whitelist and/or blacklist any systems making a request. In some embodiments, each of the requesting systems 602 can be included on a whitelist such that no external systems can make calls through the API interface 622. In some embodiments, the API interface 622 can standardize the format for requests made to any external data store 620 using, for example, a REST interface. For example, POST or GET commands received through the API interface 622 can be used to extract data sets for single client identifiers, as well as batches of multiple data sets for multiple client identifiers.

In other embodiments, the API interface 622 may include a specified format for each subset of external data stores 620 that provide similar functions, provide similar services, and/or store similar data. For example, external data stores 620-1, 620-2 may each similarly provide a certain type of data that can be used to supplement client data in the same way. One function of the external data interface 604 and the API interface 622 is to abstract the details of selecting between all of the external data stores 620 to find the right subset of external data stores that can service the request from the client device, as well as selecting one of the subset of external data stores that can optimally service the request. Therefore, the API interface 622 may include standardized interfaces (e.g., POST/GET) for accessing similar types of data. When a command is received through the API interface 622, the external data interface 604 can determine the subset of external data stores 620 that are capable of servicing the request by virtue of the type of call received through the API interface 622. Each call that is specific to a subset of the external data stores may include parameters that are needed to access the corresponding subset of external data stores 620.

As will be described below in detail, the external data interface 604 can receive requests from the API interface 622 and proceed to check a localized cache for previous results, build a full request using stored client device data, select a single external data store from the identified subset of external data stores, and package the request in a format specific to the selected external data store. The cloud system 106 may include a client data store 610 that includes information received from the client devices, such as identification information that can be used to uniquely identify the user of the client device, and which can be used by the external data interface 604 to complete otherwise incomplete requests received through the API interface 622. The cloud system 106 may also include a database for external data 612 that has been previously extracted from the external data stores 620. The database for external data 612 can be used to service requests to the external data interface 604 without making an additional call to the external data stores 620 in certain situations described below.

After results are received from the external data stores 620, the external data interface 604 can store and analyze these data for future processes. A file intake service 608 may have portions that reside both in the cloud system 106 and in the on-premises data center 138. The file intake service 608 can receive data and documentation from the external data stores 620 and encrypt and transfer them to an on premises data store 614. The external data interface 604 can also perform certain evaluations to analyze the data received from the external data stores 620. In some cases, this analysis may verify information previously provided from the requesting systems 602 or augment the client data with information that has not yet been provided from the requesting systems 602. These evaluations may interface with a workflow manager 606 to both add and remove tasks specific to a particular client data set.

It will be appreciated that each of the external data stores 620 may include a web service interface or other standard API that includes formats or parameters that are very specific to each individual external data store 620. Therefore, before sending a request, the cloud system 106 may need to perform extensive formatting and repackaging of a request received through the API interface 622 before it is sent to the external data stores 620. One of the benefits provided by the system described herein is that the API interface 622 provides a standardized and stable interface for each of the requesting system 602 to make requests. As the web service interfaces of each of the external data stores 620 change over time, the external data interface 604 can be changed centrally to match the interfaces of the external data stores such that the requesting systems 602 are isolated from these changes. Put another way, the external data interface 604 and its surrounding APIs abstract the details of interfacing directly with the external data stores 620 from each of the requesting systems 602. Furthermore, when multiple external data stores 620 offer similar services, the external data interface 604 can abstract the process of determining which subset of the external data stores 620 are capable of servicing the request, as well as selecting one of the subset of external data stores 620 for servicing a particular request.

The process of formatting and packaging a request for the external data stores can be distributed between the external data interface 604, an API interface/gateway 624, and an Enterprise Service Bus (ESB) 628. The external data interface 604 may use a high-level programming language, such as C# or C++. Complex mappings between the data received from the API interface 622 and the required formats of the external data stores 620 can be performed in the external data interface 604, such as initially populating the request data fields and performing data transformations. Other lower-level mappings can be performed in the ESB 628, such as simple conversions between standardized formats (e.g., XML and JSON). The ESB 628 can also provide a second layer of security by whitelisting/blacklisting systems such that only the external data interface 604 and other approved systems can make calls through the ESB 628 to the external data stores 620.

Another API interface/gateway 626 can be used for synchronous calls to external data stores 620. For example, each external data store 620 may have different session characteristics, including a session timeout interval. For some external data stores 620-4 that require a longer session (e.g., 90 seconds) to service requests, the API interface/gateway 626 can handle the timing and handshakes between the external data store 620-4 and the cloud system 106. For example, the external data store 620-4 may interface with another external system and act as a middleman between the external system and the cloud system 106. This may require a longer session interval while the external data store 620-4 interacts with the external system.

Figure 6:
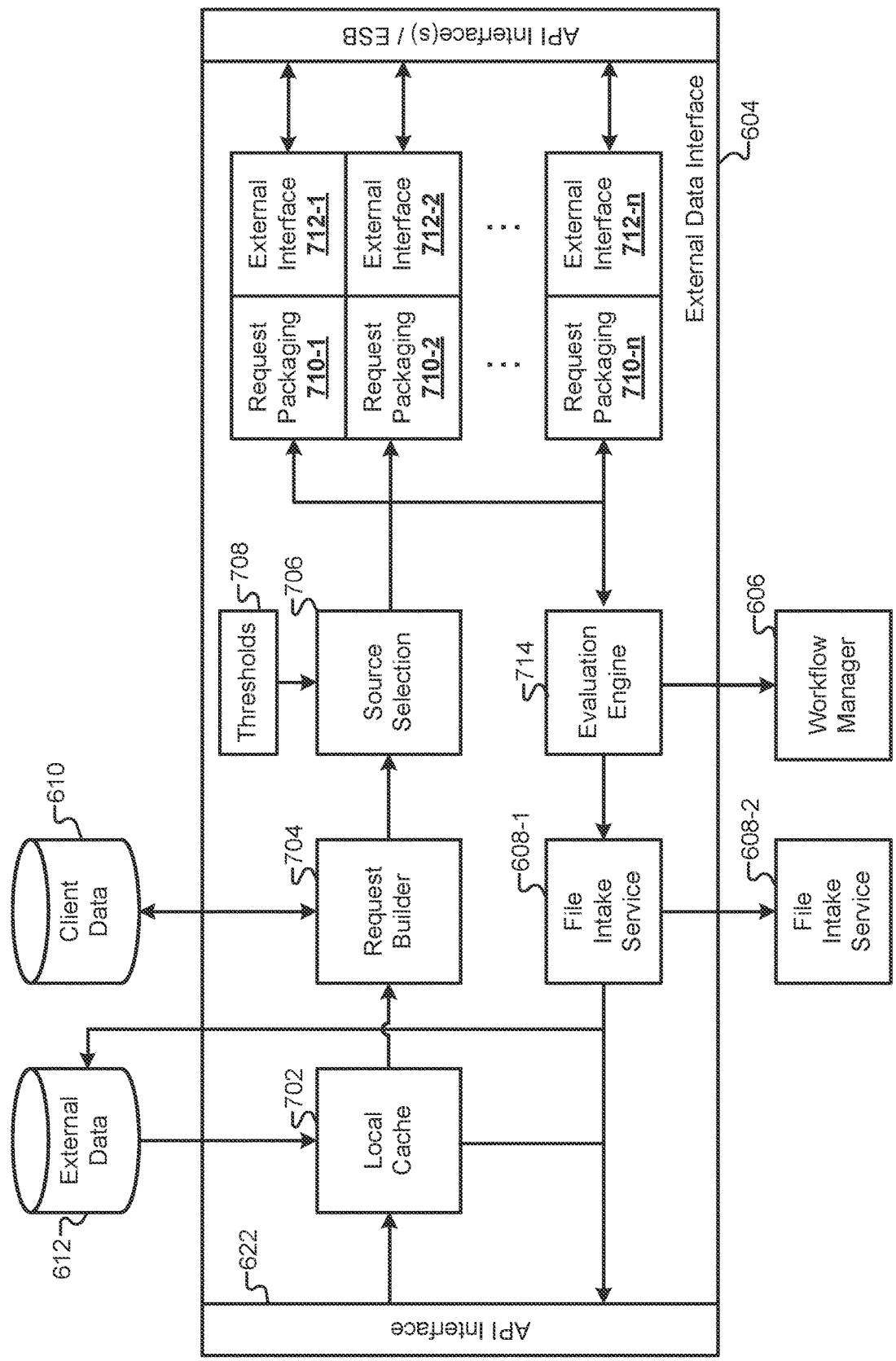
FIG. 6 illustrates a simplified block diagram of the external data interface, according to some embodiments.

FIG. 6 illustrates a simplified block diagram of the external data interface 604, according to some embodiments. After receiving the request through the API interface 622, the external data interface 604 can determine a type for the request. The type may be determined based on a particular call made through the API interface 622. For example, functions performed by the external data interface 604 may be associated with particular calls through the API interface 622. The external data interface 604 can receive a call and look up a subset of external data stores 620 that are capable of servicing the particular request type. Note that multiple calls may be made through the API interface 622 for the same subset of external data stores 620, such as both a GET and a POST call for a single functionality to service single and batch requests, respectively.

After receiving the request, and before accessing any of the external data stores 620, the external data interface 604 can execute a local cache function 702 that checks the database of external data 612 to determine whether the request can be serviced locally. The database of external data 612 can store data previously received from the plurality of external data stores 620. This can be useful for servicing duplicate requests where the resulting data sets have been recently retrieved from the plurality of external data stores 620.

If the local cache process 702 determines that a call needs to be made to the external data stores 620, the request can be forwarded to a request builder 704. The request builder can determine whether the information provided in the request is sufficient for the selected external data store to service the request. If additional information is needed, the request builder 704 can access the client data store 610 to retrieve information that has previously been provided by the client device. This allows the request made through the API interface 622 to be fairly simple, providing, for example, only a client identifier when the actual requests made to the external data stores require a more substantial set of client data to service the request.

A source selection process 706 can take the identified subset of the plurality of external data stores 620 that are capable of servicing a request type, and select a single external data store to service this particular request. A stored set of thresholds 708 that can be dynamically updated in real-time can be used by the source selection process 706 to balance the manner in which requests are funneled between the plurality of external data stores 620.

As described above, once a single external data store is selected, it may require very specific formatting according to its exposed web interface. For each of the plurality of external data stores 620, the external data interface may include a specific request packaging function 710 and external interface 712. The request packaging function 710 can perform the high-level repackaging of the request received from the request builder 704 to match the format and data fields required by the selected external data store. The external interface 712 can then handle the interaction between the external data interface 604 and the selected external data store. One advantage provided by this system is that when the public interfaces of the external data stores change, the only changes that need to be made to the cloud system 106 can be isolated to the request packaging functions 710 and the external interfaces 712. Therefore, these changes and external-system-specific details can be abstracted from the rest of the cloud system 106.

The external interfaces 712 can handle all of the interactions with the external data stores 620, including initiating a session, handling the communication protocol, enforcing security requirements, and monitoring the individual timeout intervals. Each of these functions may be very specific to the particular external interface 712. After receiving a resulting data set from the external data stores, the request packaging functions 710 can translate any results received into a common format for the cloud system 106. Again, this ensures a stable data interface for any requesting system while abstracting the specific formatting details of the external data stores 620. The request packaging functions 710 can generate a standardized response with a payload that may be specific to each subset of external data stores (or request type). Thus, any requesting system 602 making a particular function call through the API interface 622 can receive a standardized response regardless of which of the plurality of external data stores 620 actually services the request.

Before being forwarded to the requesting system, the formatted response can be evaluated by an evaluation engine 714. For example, the data received from the external data store may be used to verify fields provided from the client device. The evaluation engine 714 can compare fields received from the client device to corresponding fields in the formatted response to determine whether the fields received from the client device can be verified. Some embodiments may use stored thresholds or other metrics in that comparison. For example, if a value provided by the client device is within 5%, 10%, 50%, 20%, etc., of the corresponding value provided from the external data store, then the value in the field provided by the client device can be verified. In another example, a value provided from the external data stores 620 can be analyzed without requiring comparisons to data received from the client device. Some external data stores may provide a score or metric for a user of the client device. This score can then be compared to predetermined score thresholds to determine whether certain actions need to be taken by the user of the client device, or whether the user of the client device is eligible for certain workflow options. The evaluation engine 714 can use the evaluation results to interface with the workflow manager 606. For example, if values provided from the client device can be verified using corresponding values received from the external data stores, then certain tasks can be eliminated from a client workflow in the workflow manager 606. Conversely, if these values cannot be verified, then the evaluation engine 714 can add tasks to the workflow, such as requiring additional and/or manual verification of these values.

Some embodiments may include a file intake service 608. The file intake service may include a first component 608-1 that is resident in the external data interface 604 and/or the cloud system 106, as well as a second component 608-2 that is resident on the data center 138. Some external data stores may provide documentation that can be used later to document and/or prove the data received from the external data stores 620. These documents are generally not needed in the external data interface 604 to service future requests, but may be required to complete the process described above in FIGS. 1-4, an may require secure storage. Therefore, the first component 608-1 can transfer documents and/or data to the second component 608-2 in the data center 138 to be encrypted and securely stored. In some embodiments, the first component 608-1 can generate a message that is sent to the second component 608-2 indicating that new data and/or documents are available. The second component 608-2 can then pull documents and/or documents from the first component 608-1, perform any necessary document format conversion, encrypt the results, and store them securely in the on-premises data store 614. Note that the second component 608-2 can pull documents from the first component 608-1 using batch requests or at a later time after the request is serviced. The second component 608-2 can also subscribe to messages or events produced by the first component 608-1.

The data retrieved from the external data stores 620 can then be returned in a response having a standardized format for the request type through the API interface 622. In some embodiments, results of the evaluation engine 714 can also be included in the response. For example, some responses can include a flag or indication denoting whether the data provided by the client device was verified by the data provided from the external data stores 620.

In the example architecture described above, the cloud system and the on-premises data center executed numerous processes for granting access to a resource. As these processes are executing, the processes may require verification that the resource is protected according to at least a minimum standard. Prior to this disclosure, the process on the requesting system was paused, and the requesting system had to send a resource protection verification request directly to a resource protection system that was responsible for providing protection for the resource. However, at least two technical problems would commonly arise from this paradigm, each of which caused the process to run inefficiently on the hardware of the underlying requesting computer system by requiring more processing power, more memory resources, and increasing the latency with which communications were completed over a network.

First, there are hundreds or even thousands of different resource protection systems currently in existence, each with their own communication interface, resource protection policies, and latencies in responding to a request for resource protection verification. Simply knowing the address of the resource (or some other resource-specific descriptor) was not sufficient to determine a particular resource protection system that was enforcing a resource protection policy on the particular resource. Instead, the requesting system needed to receive a manual indication identifying a particular resource protection system that was enforcing a resource protection policy for the particular resource. This added a manual step to the process that increased an amount of time during which the executing process was paused. This was also an error-prone process, as a user could misidentify or misremember a particular resource protection system enforcing a policy for the given resource.

The second technical problem involved the network latency required to complete a resource verification request. Specifically, when a verification request was sent directly from the requesting system to a resource protection system, the requesting system had to wait for the resource protection system to respond. In essence, the requesting system was left at the mercy of the resource protection system. Many resource protection systems employ processes that have very slow response times, such as minutes or even hours, to process a large number of verification requests. While waiting for a response to the request, the requesting system typically pauses the ongoing process related to the resource and waits for the verification response. Response times of more than 60 seconds have been shown to occasionally cause client devices working with the requesting system to abort the process that was paused. Additionally, pausing these processes caused computing hardware/software at the requesting system to be unavailable for other similar processes that were waiting to execute on the requesting system hardware.

The embodiments described herein solve these and other technical problems related to the efficiency with which a process can operate on requesting system hardware. The operations and systems that solve these problems include an intermediate server that acts as a resource protection verification server ("verification server"). The verification server receives periodic uploads from each subscribing resource protection system. These uploads include a subset of the data stored by each of the resource protection systems related to the individual resource protection policies being enforced. The verification server stores these data subsets related to resource protection policies in a database that can be queried using a resource address. When a resource verification request is received, the verification server does not need to know the specific resource protection system enforcing a resource protection policy for the given resource. Instead, the verification server can simply use the address of the resource to access a subset of data in its local database that is sufficient to verify that the resource protection policy is being enforced. This verification can be completed in a matter of seconds rather than minutes or hours as described above.

In one real-world test system, the following improvements in the operation of a requesting process on the hardware of the requesting system could be observed. In one time interval, the requesting system observed approximately 500 processes related to resources. Each of these processes required a verification of a resource protection policy, as well as data related to the resource protection policy. Each of these processes was paused while a verification request was sent directly to the resource protection systems. On average, the delay between the sending of the request and the receipt of a verification transmission was approximately 3 minutes, during which time approximately 25 of the processes executing on the requesting system were terminated. Additionally, 15 of the verification requests were unanswered. Approximately 50 of the processes were terminated because the resource protection system for the particular resource was not identified or was misidentified for the corresponding request.

When the embodiments described herein were used such that verification requests could be sent to the verification server instead of to individual resource protection systems, the average delay between sending the request and the receipt of a verification transmission was approximately 15 seconds. Because of the ability to estimate a resource protection policy described below, none of the 500 verification requests went unanswered. Additionally, the verification requests without a known resource protection system that previously resulted in process termination (or at least significant delay) were all serviced by the verification server. Therefore, the technical improvements provided by the verification server can be summarized as follows. The request latency using the verification server was approximately 8% of the request latency without using the verification server. Process termination due to unresponsive resource protection systems and/or unknown resource protection systems was virtually eliminated. The processing/memory resources at the requesting system that were previously unavailable as processes were paused were effectively freed to increase the number of processes that could operate on the requesting system per hour by approximately 300%.

Figure 7:
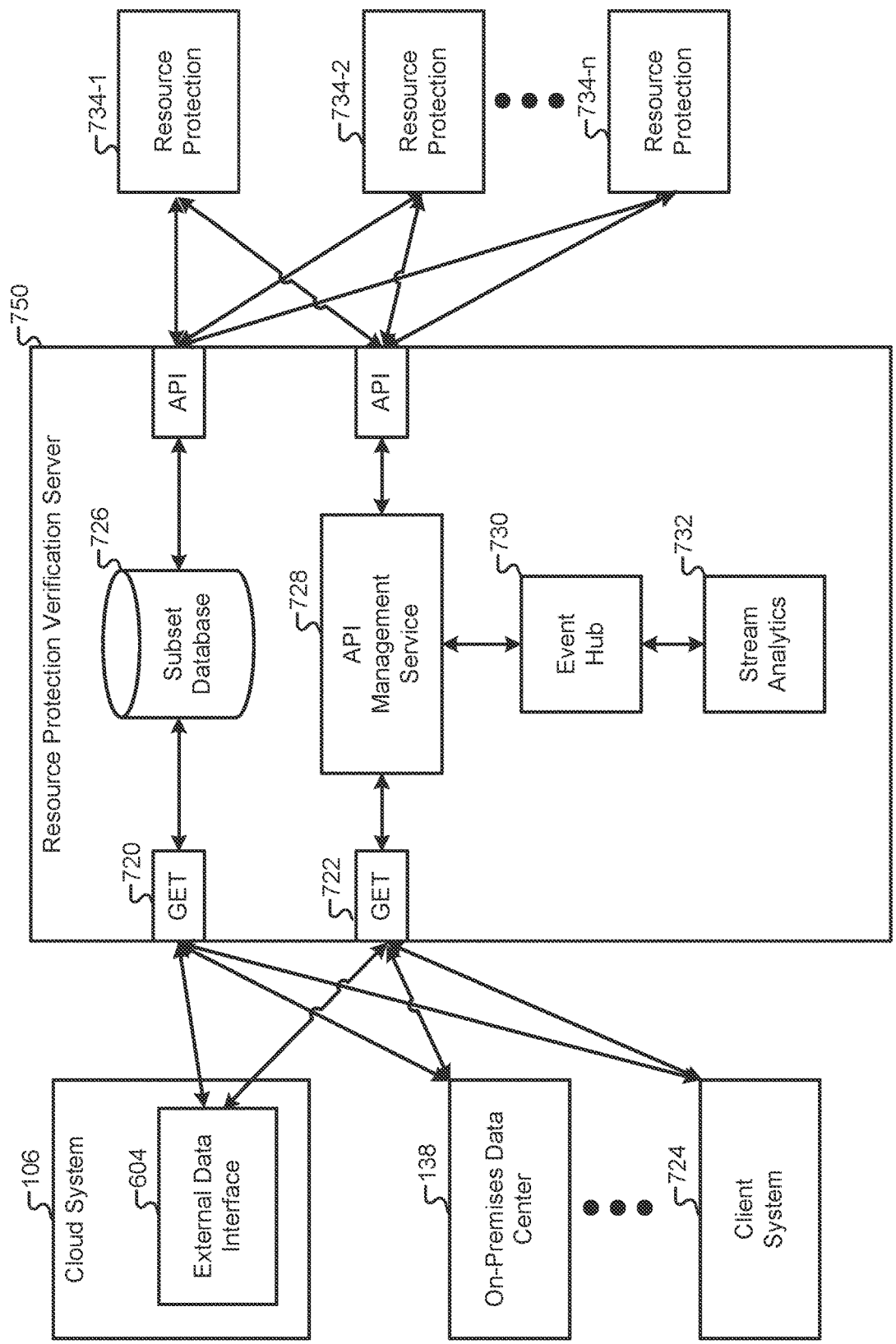
FIG. 7 illustrates a simplified architecture diagram of a resource protection verification server interacting with a plurality of requesting systems and a plurality of resource protection systems, according to some embodiments.

FIG. 7 illustrates a simplified architecture diagram of a resource protection verification server 750 interacting with a plurality of requesting systems 106, 138, 724 and a plurality of resource protection systems 734, according to some embodiments. A number of different computer systems 106, 138, 724, referred to herein as "requesting systems," can each execute multiple processes related to resources. As these processes are executed to grant access to resources to client devices, each of the requesting systems may require verification of resource protection and/or data values related to a particular resource. Each of these requesting systems 734 can make requests to the verification server 750 to receive a verification that a resource protection policy is in force and/or to receive specific data values describing the resource protection policy.

The verification server 750 may include one or more web interfaces 720, 722. For example, a web service interface may include one or more GET commands that can be used by the requesting systems to request information associate with specific resource protection policies. The web interfaces 720, 722 can accommodate many requests simultaneously such that the many processes operating on the requesting systems can make requests through the interfaces 720, 722 without significant delay.

The verification server 750 may be physically separate from any and/or all of the requesting systems 106, 138, 724. In some embodiments, the verification server 750 may be located in a separate facility that is separated from any and/or all of the requesting systems by a distance of at least one mile. The requesting systems may communicate with the verification server 750 over a network, such as a LAN, a WAN, the Internet, etc. The verification server 750 may be hosted in a cloud-based system that is separate from the cloud system 106 described above. A "requesting system" to be characterized as any computer system that sends a request to the verification server 750. The request may request a simple verification that a resource protection policy is in force and/or may include additional information, such as particular data values associated with the resource protection policy.

The verification server 750 may include hardware and/or software components that are configured to provide fast responses to resource protection verification requests from the requesting systems. For example, the verification server 750 may include a subset database 726. As will be described in detail below, the subset database 726 may include subsets of data that describe resource protection policies that are enforced by the various resource protection systems 734. Many requests from the requesting systems may only require an indication that a resource protection policy is currently in force as specified by one of the resource protection systems 734. Some requests may also require one or more data values that are associated with the current resource protection policy. These data values can be stored in the subset database 726 and returned in response to requests from the requesting systems. Data values requested and retrieved from the subset database 726 can be accessed through a first GET command 720 in the web interface of the verification server 750.

The verification server 750 may also include API interfaces that can interact with the various external resource protection systems 734. In some embodiments, the verification server 750 may be physically separate from any and/or all of the resource protection systems 734. Each of the resource protection systems 734 may also be physically separate from each other, such that they are operated/owned by different entities and/or executed on physically separate computer systems in separate facilities that are separated by at least one mile. The resource protection systems 734 may communicate with the verification server 750 over a network, such as a LAN, a WAN, the Internet, etc. As will be described in detail below, the resource protection server 734 can periodically provide uploads of data subsets to the verification server 750. These uploads can be used to populate the subset database 726 with information regarding resource protection policies that can be indexed by a resource address or other identifier. When requests are received from one or more of the requesting systems, the resource address or other identifier can be used to index the subset database 726 and retrieve the requested information without needing to contact the particular resource protection system 734-1 providing the information. A "resource protection system" may be characterized as any computer system that administers resource protection policies for resources. The resource protection system may provide a set of data values and/or a subset of data values that are descriptive of different aspects of the resource protection policy. In some embodiments, the APIs that allow for communication between the verification server 750 and the resource protection systems 734 may be standardized in the functionality of the API may be implemented by the resource protection systems 734 themselves.

A second GET command 722 command can be available in the web interface of the verification server 750. The second GET command 722 can be used to retrieve a full set of information regarding a resource protection policy. In some embodiments, the verification server 750 can store full versions of the resource protection policy locally at the verification server 750. Alternatively, the verification server 750 can then act as an arbitrator between the requesting systems and the various resource protection systems 734 to retrieve the full set of information from the corresponding resource protection system. The full set of information describing the resource protection policy can include many data fields that are not included in the subset of data stored at the subset database 726.

As information is passed back and forth through the verification server 750, an event hub 730 and a stream analytics module 732 can analyze the data in real time and provide notifications to the requesting systems and/or the resource protection systems based on the data traffic. As will be described in greater detail below, the event hub 730 can trigger on data as it flows through the system, analyze the data, and take certain actions, such as sending notifications to one or more systems. The stream analytics module 732 can analyze the data and generate summary information, such as heat maps and other statistical representations of the data that are useful for both the requesting systems and the resource protection systems 734.

Figure 8:
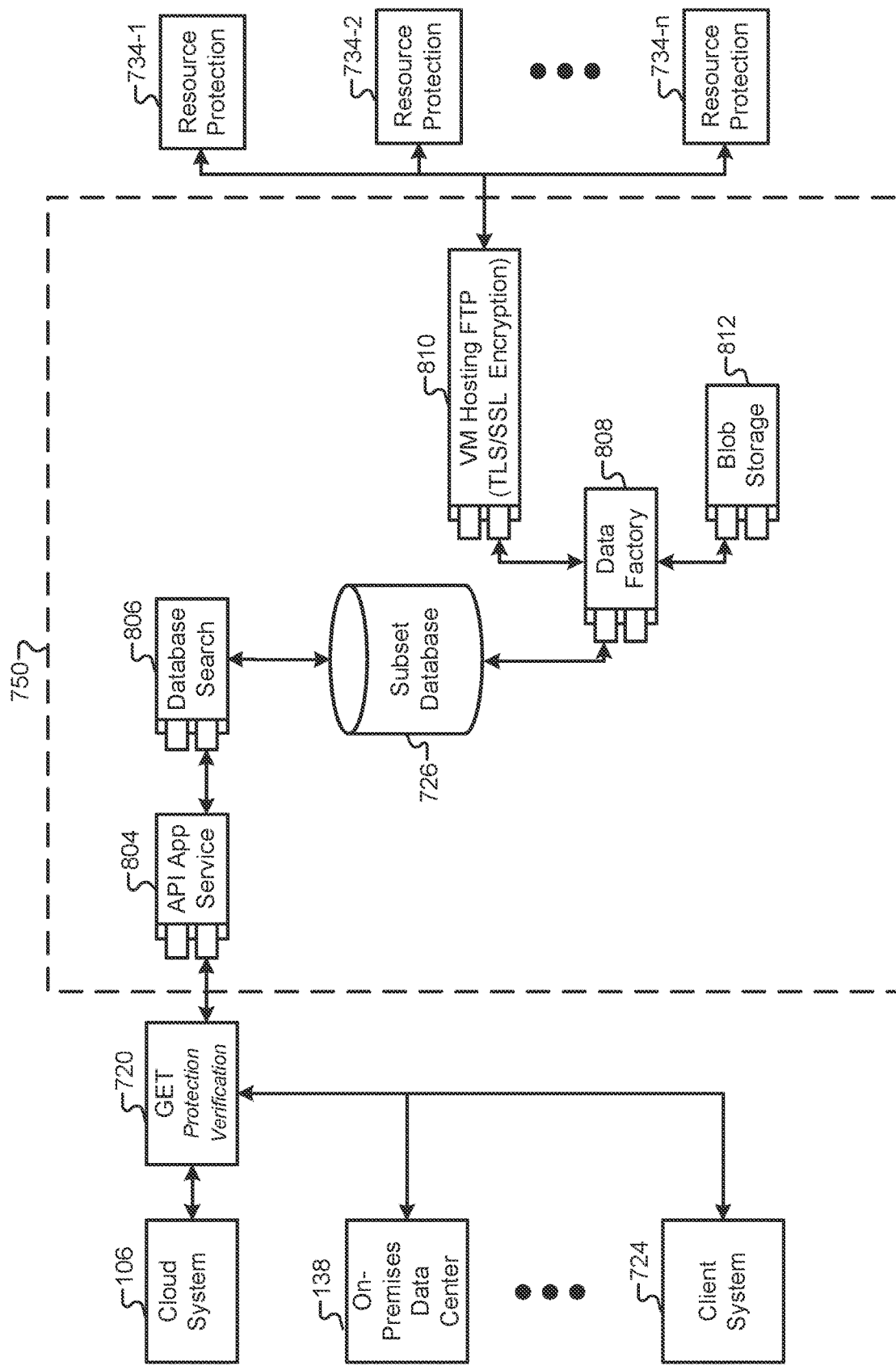
FIG. 8 illustrates a cloud-based architecture of a first GET command for the verification server, according to some embodiments.

FIG. 8 illustrates a cloud-based architecture of a first GET command 720 for the verification server 750, according to some embodiments. As described above, the two different GET commands that are exposed by the web service of the verification server 750 can return different types of information. The first GET command 720 can be used to retrieve a subset of data values that are related to a specific resource and its protection. The body of the request sent through the first GET command 720 may include at least an address or other identifier for the resource. In some embodiments, the payload of the response to the request generated by the verification server 750 may include a relatively small number of data fields compared to a full resource protection data set. This subset of data may include an identification of the resource protection system associated with the resource, a time interval during which the protection policy is in force, and a numerical value that is used by the paused process on the requesting system.

Prior to this disclosure, requesting systems had to contact the individual resource protection systems. This meant that the requesting systems had to know the identity of the resource protection system that was associated with the resource. Because there are thousands of resource protection systems, some of which are confusingly similar in name and/or function, it was common for mistakes to be made such that the correct resource protection system was not properly identified by the requesting system. The verification server 750 solves this problem by collecting the data subsets from each of the resource protection systems and indexing them in the subset database 726. Thus, the first GET command 720 only requires the requesting system to properly identify the resource, and that information can be extracted from the first GET command 720 to index the subset database 726 to retrieve the identity of the corresponding resource protection system.

In the embodiment depicted in FIG. 8, the verification server 750 can be implemented in a cloud-based architecture or environment. The first GET command 720 can be received by a RESTful API Application Service 804 available in a cloud environment, such as the Microsoft Azure® cloud environment. The API Application Service 804 may include an application service that can be used to build API applications to handle incoming requests. The API Application Service 804 can pass the request to a cloud search module 806 that is coupled to the subset database 726. The cloud search module 806 can generate indices and search the subset database 726 using the resource address/identifier received in the first GET command 720. The subset database 726 may be implemented with any cloud database system, such as the Cosmos® NoSQL database.

As described briefly above, the verification server 750 may also receive periodic uploads from the resource protection systems 734. When a resource protection system 734 registers with the verification server 750, APIs at the resource protection systems 734 and/or at the verification server 750 can be used to handle these uploads. For example, every 24 hours (e.g., each night), each of the resource protection systems 734 can upload a complete collection of data subsets for each resource protected by the respective resource protection systems 734.

The verification server 750 can receive these periodic uploads through the use of an FTP server. The cloud environment can include a virtual machine (VM) 810 that hosts an FTP server. The FTP server may include transport layer security (TLS) and/or secure sockets layer (SSL) encryption to protect information provided to the verification server 750. A data factory 808 may be included to accelerate data integration with native data connectors. Specifically, the data factory 808 may be configured to provide a variety of services, such as transformations, translations, filtering, etc., to standardize the format of the information provided by the resource protection systems 734. In some embodiments, the VM 810 hosting the FTP fileshare can provide uploaded data subsets to the data factory such that they can be formatted and consumed by the subset database 726. Some embodiments may also include a blob storage 812 configured to store objects as unstructured data. Specifically, the blob storage 812 may store files received from the resource protection systems that can receive secure transfers from the resource protection systems before being ingested into the subset database 726.

The specific cloud architecture illustrated in FIG. 8 is provided merely as one example of how the systems and methods described herein can be implemented as a verification server 750. Other embodiments can use different hardware and/or software combinations to achieve similar functions with varying levels of efficiency. For example, another embodiment may use a cloud-based environment that is shared with the cloud system 106 described above. Another embodiment may share hardware with the on-premises data center 138. Other embodiments may use custom hardware/software that is completely separate from any of the systems described above. Therefore, the particular arrangement of hardware/software in FIG. 8 is not meant to be limiting.

Figure 9:
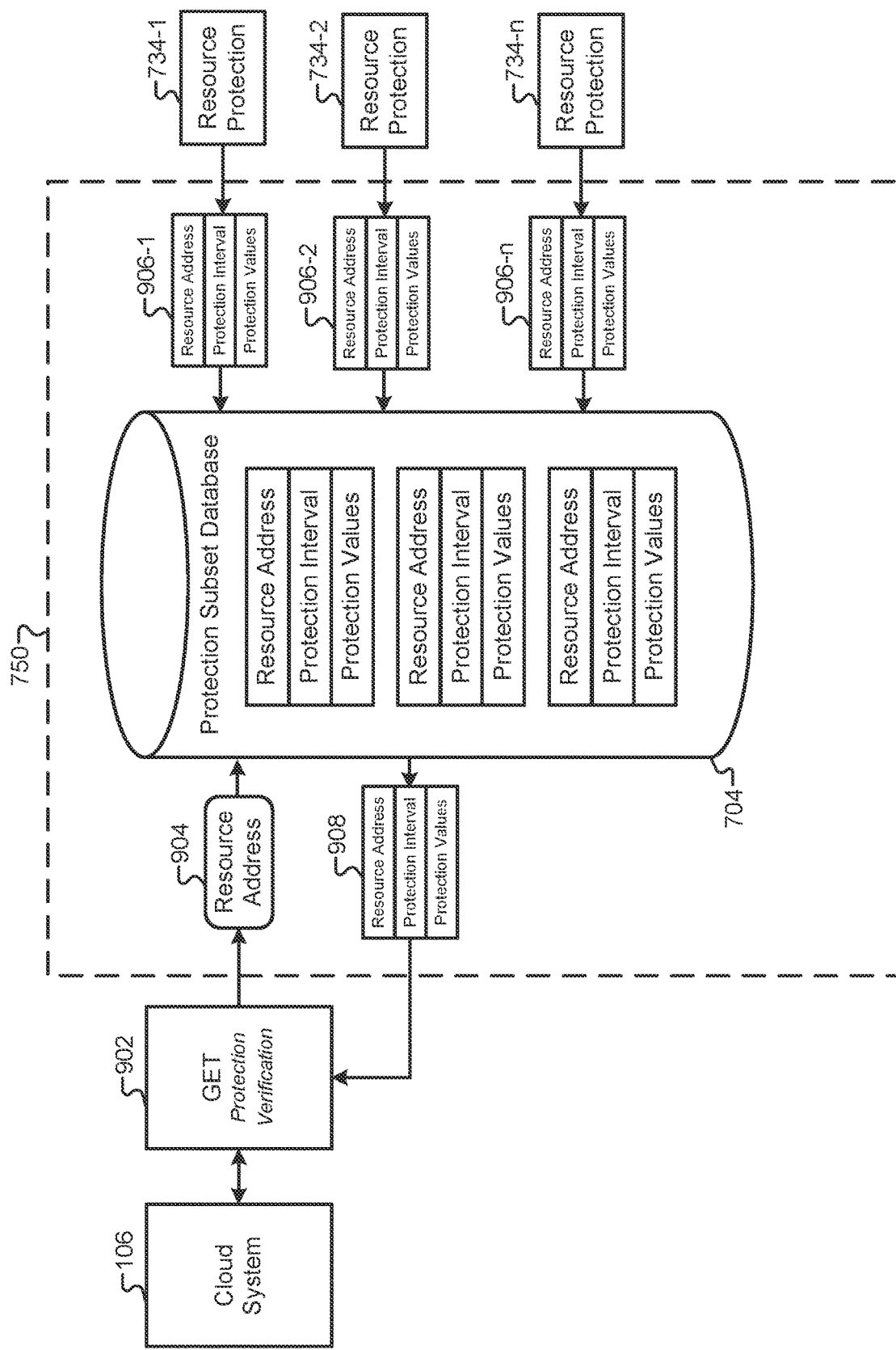
FIG. 9 illustrates a data flow diagram of how data subsets can be provided from resource protection systems, according to some embodiments.

FIG. 9 illustrates a data flow diagram of how data subsets 906 can be provided from resource protection systems 734, according to some embodiments. A full resource protection data set may include 30-50 distinct data values that are descriptive of, or define a single resource protection policy. However, it has been discovered that many of the processes executing on the requesting systems can resume after receiving only one or two values from the full resource protection data set. Therefore, the verification server 750 can optimize its internal memory usage by only storing data subsets. The data subsets may be distinguished from the full resource protection data sets by including only information required for the processes executing on the requesting systems to continue. For example, the data subsets in some embodiments may include a resource address or other identifier that uniquely identifies the resource; an indication of a protection interval, such as a date/time through which the resource protection policy will be valid or in force; and/or one or more numerical values that characterize the resource protection policy. Some embodiments may also store an identifier for the particular resource protection system 734-1 associated with the resource. Prior to this disclosure, this indication of a corresponding resource protection system needed to be provided with the request rather than returned with the response. By limiting the amount of information stored at the verification server 750, the memory usage of the verification server 750 can be optimized such that total memory usage can be reduced by more than 90% by storing a collection of data subsets when compared to storing corresponding full resource protection data sets for each cataloged resource.

Periodically, the verification server 750 can receive collections of data subsets 906 from the resource protection servers 734. In some embodiments, the resource protection servers 734 can provide a full catalog of data subsets 906 for each resource registered with the corresponding resource protection server. In other embodiments, the resource protection servers 734 can instead provide a list of changes/updates to the verification server 750 such that only changed data subsets are uploaded each night. In some embodiments, the resource protection systems 734 can initiate the uploads to the verification server 750. In other embodiments, the verification server 750 can alternatively and/or additionally send a request to each registered resource protection system 734 to request an upload of the data subsets 906.

When the data subsets 906 are received by the verification server 750, the software components described above in FIG. 8 can standardize the format of the data received from each of the resource protection systems 734. Each resource protection system can provide different data values and use different data formats. In some embodiments, the resource protection systems may transmit full resource protection data sets to the verification server 750, and the verification server 750 can filter out the data values that are not necessary to respond to the first GET command 902 described above. The data factory described above may use a standardized format such that each of the data subsets stored in the subset database 704 are identical in format.

When the subset database 704 receives the data subsets 906, the subset database 704 can store the data subsets 906 without basing the storage organization on the respective source data protection system from which they were received. Therefore, data subsets 906 from each of the resource protection systems 734 can be stored together without being partitioned into separate databases based on source. Instead, the subset database 704 can store the data subsets 906 such that they can be indexed based on the address/identifier for the resource.

The request through the first GET command 902 only needs to include the address/identifier 904 for the resource in order to submit a valid request. The verification server 750 can parse the GET command and extract the address/identifier 904. The address/identifier 904 can then be provided to the database search module 806 described above to retrieve the corresponding data subset 908 from the subset database 704. The requested data subset 908 can provide numerical values that may be required by the paused process on the requesting system. The requested data subset 908 may also act as a verification that a resource protection policy is active and valid.

Figure 10:
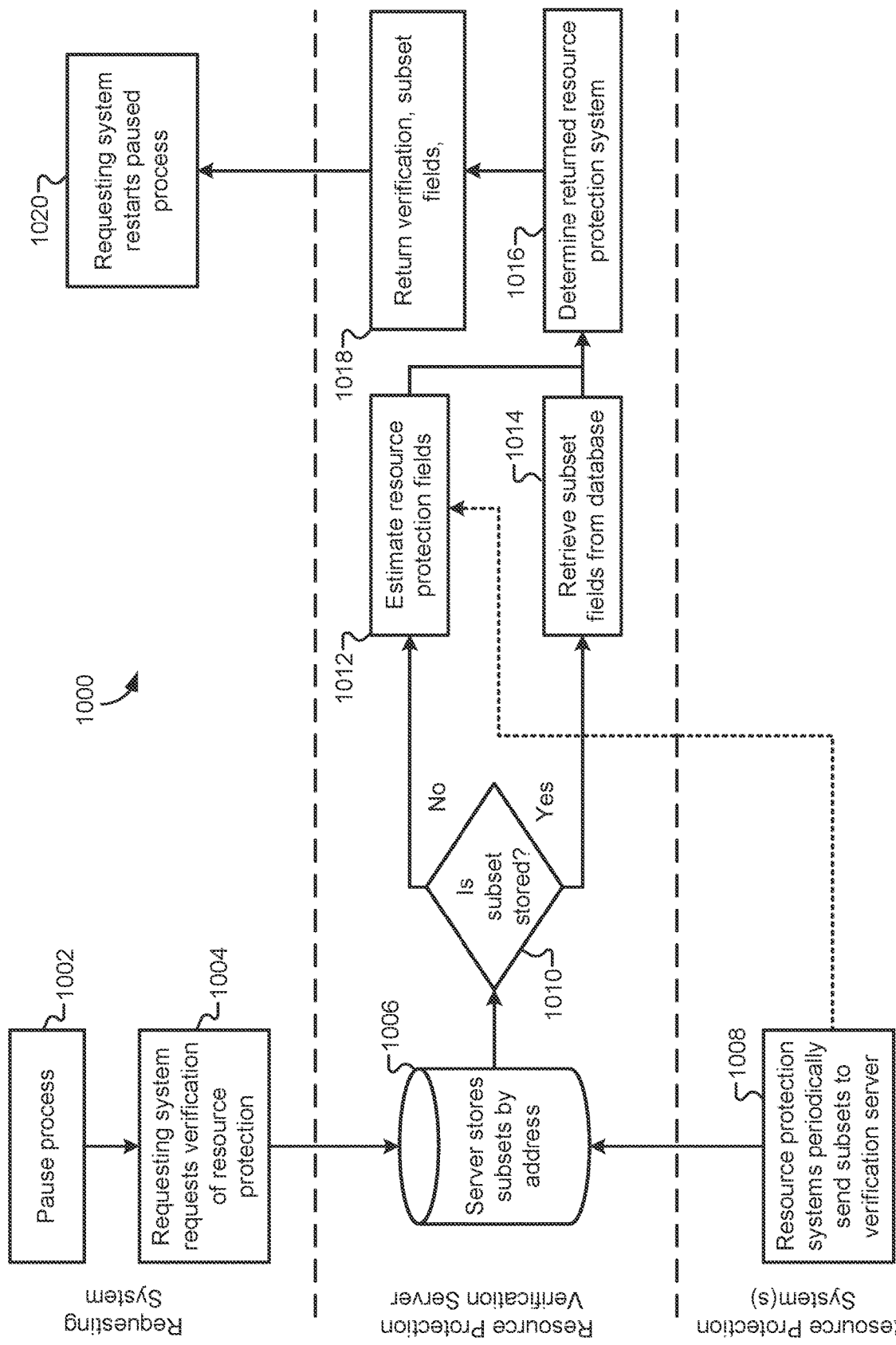
FIG. 10 illustrates a flowchart of a method for retrieving a data subset and/or verifying resource protection, according to some embodiments.

FIG. 10 illustrates a flowchart 1000 of a method for retrieving a data subset and/or verifying resource protection, according to some embodiments. The requesting system may execute a process locally on the computer system, such as a cloud system, an on-premises data center, etc. The process may be associated with a particular resource, and the process may require information regarding the protection of the resource before the process can continue. For example, the process may require a verification that the resource is protected. The process may require one or more data values that describe an aspect of the protection of the resource. The process may require an indication of a resource protection system that is responsible for the resource protection. The process may require a protection interval during which a resource protection policy is valid. When the process requires this information, the process may pause (1002) until such information is received. When pausing the process, the requesting system can send a request for verification/information regarding resource protection to the verification server (1004).

In an independent, parallel thread, the resource protection systems can provide periodic uploads of data subsets regarding data protection policies to the verification server (1008). These uploads can be stored in a subset database that is searchable by an identifier/address of each resource. The data subsets from many different resource protection systems can be stored together in the subset database. When the request from the requesting system is received by the verification server, the verification server can determine whether subset database stores a data subset that corresponds to the resource address/identifier (1010). If the requested data subset has been uploaded to the verification server from the resource protection system(s), then the verification server can retrieve the subset fields from the database (1014) by virtue of the identifier/address of the resource. The fields from the data subset may include an indication of a particular resource protection system that sourced the information (1016). The fields from the subset database can then be returned to the requesting system (1018). When these data fields and/or a verification that the resource is protected are received by the requesting system, the requesting system can restart the paused process using the data provided by the verification server (1020).

In some embodiments, the verification server can handle situations where a resource is either unprotected or situations where a corresponding resource protection system has not yet uploaded a data subset corresponding to the resource. The process may also include determining that a corresponding subset is not stored in the subset database by the verification server (1010). A data subset might not be stored in the subset database for a number of different reasons. In some instances, the particular resource protection system associated with the resource may not yet subscribe to the verification server. Thus, the verification server would not receive periodic uploads of data subsets from the unsubscribed resource protection systems. In other instances, the resource may not be protected by a resource protection system at all.

In cases where a data subset is not available from the verification server, the method may include estimating some of the data fields that would likely be part of the data subset (1012). The estimation process can use a number of different methods to estimate these data values. In some embodiments, the process may look up similar resources in the subset database and average the values for the similar resources to generate an estimated data value for the current resource. For example, resources having addresses that are numerically close to the current resource may be retrieved, and their data values may be averaged to generate estimated data values for the current resource. In another example, resources having characteristics similar to the current resource may be retrieved and have their data values averaged. In some embodiments, the process may submit the address/identifier for the resource to one or more of the resource protection systems. The resource protection systems can then generate estimated data values for the current resource that would be used if the resource protection systems were to provide a resource protection policy for the current resource.

When data values are estimated, the method can determine a particular resource protection system that can be used to protect the resource. In some embodiments, when estimated data values are received from one or more resource protection systems, the method can compare the estimated values and select a resource protection system that generated the most efficient values. In some embodiments, the verification server may maintain a list of preferred resource protection systems and submit the most preferred resource protection system providing estimated data values as a recommendation to the requesting system (1016).

Figure 11:
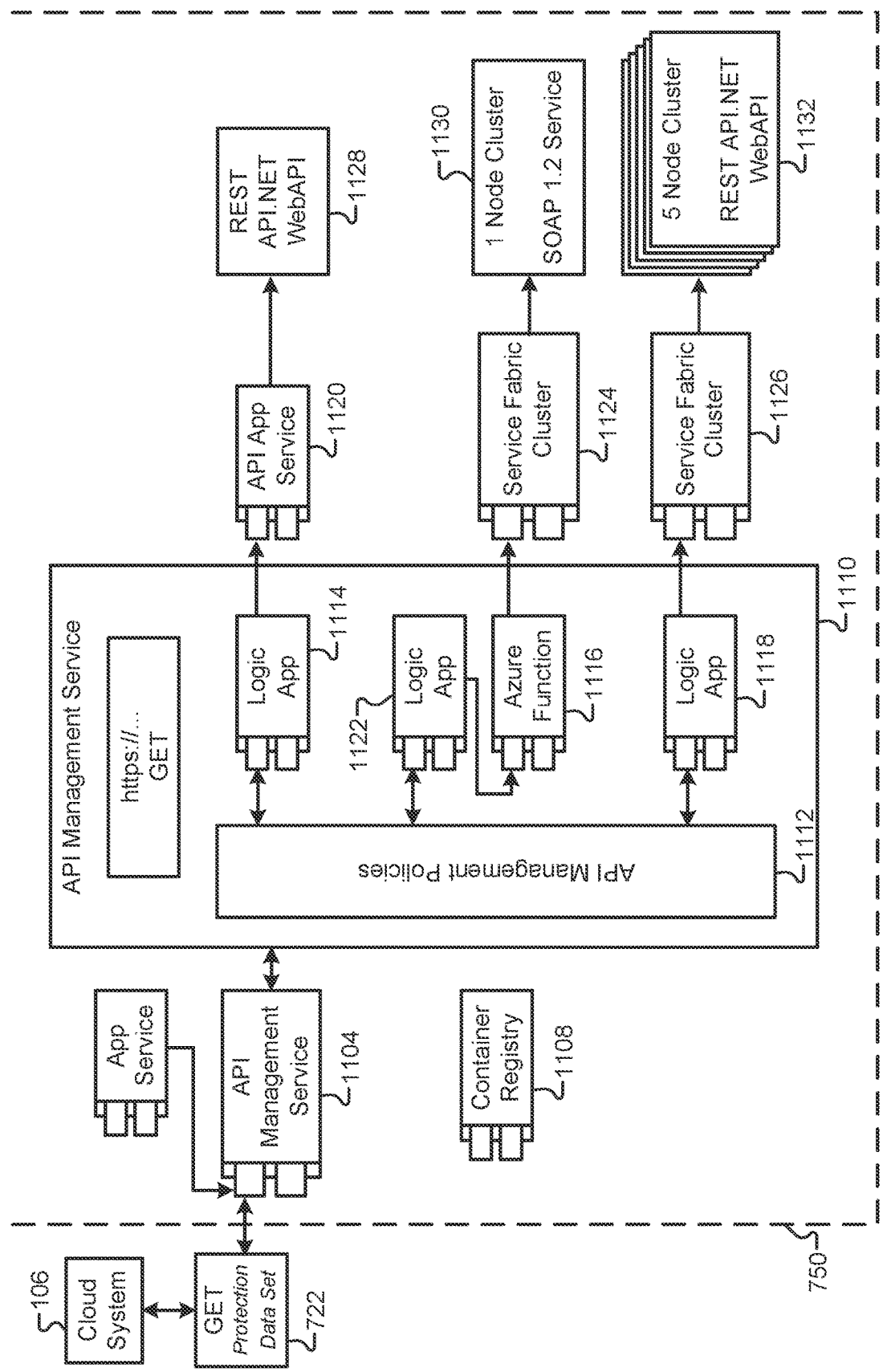
FIG. 11 illustrates a block diagram of a data path for a second GET command for retrieving a full data set, according to some embodiments.

The method described above is useful for retrieving data subsets related to a resource protection policy. However, the processes operating on a requesting system may later be paused a second time in order to retrieve the full data set related to the resource protection policy. FIG. 11 illustrates a block diagram of a data path for a second GET command 722 for retrieving a full data set, according to some embodiments. The architecture may receive a GET command at an API management service 1104. The API management service 1104 may be comprised of a module that organizes the various APIs in the verification server 750 and routes data accordingly. The verification server 750 may also use a containerized environment, and may therefore include a container registry 1108 that tracks and organizes the different containerized software functions in the verification server 750.

The API management service may include an API management policy module 1112 to manage access restrictions, control flow, authentication, caching, data transformation, and other routing mechanisms for parsing the GET command received from the requesting system and preparing the request for one or more resource protection systems. Each of the resource protection systems may include a specific API that is tailored to handle the specific data formats, communication handshakes, and session protocols for each particular resource protection system. Each resource protection system may be paired with a Logic App 1114, 1122, 1118, additional API App Services 1120, and one or more function modules 1116 to generate POST commands for external RESTful APIs. The data path for some resource protection systems may include a Service Fabric Cluster 1124, 1126, and some may use various WebAPI interfaces, such as a REST API.NET WebAPI 1128, 1132 and/or a SOAP 1.2 Service 1130, which may be organized in multiple-node clusters.

The architecture illustrated in FIG. 11 is specific to a particular cloud infrastructure and is not meant to be limiting. As described above, the verification server 750 may be implemented on any cloud platform or on-premises data center without limitation.

Figure 12:
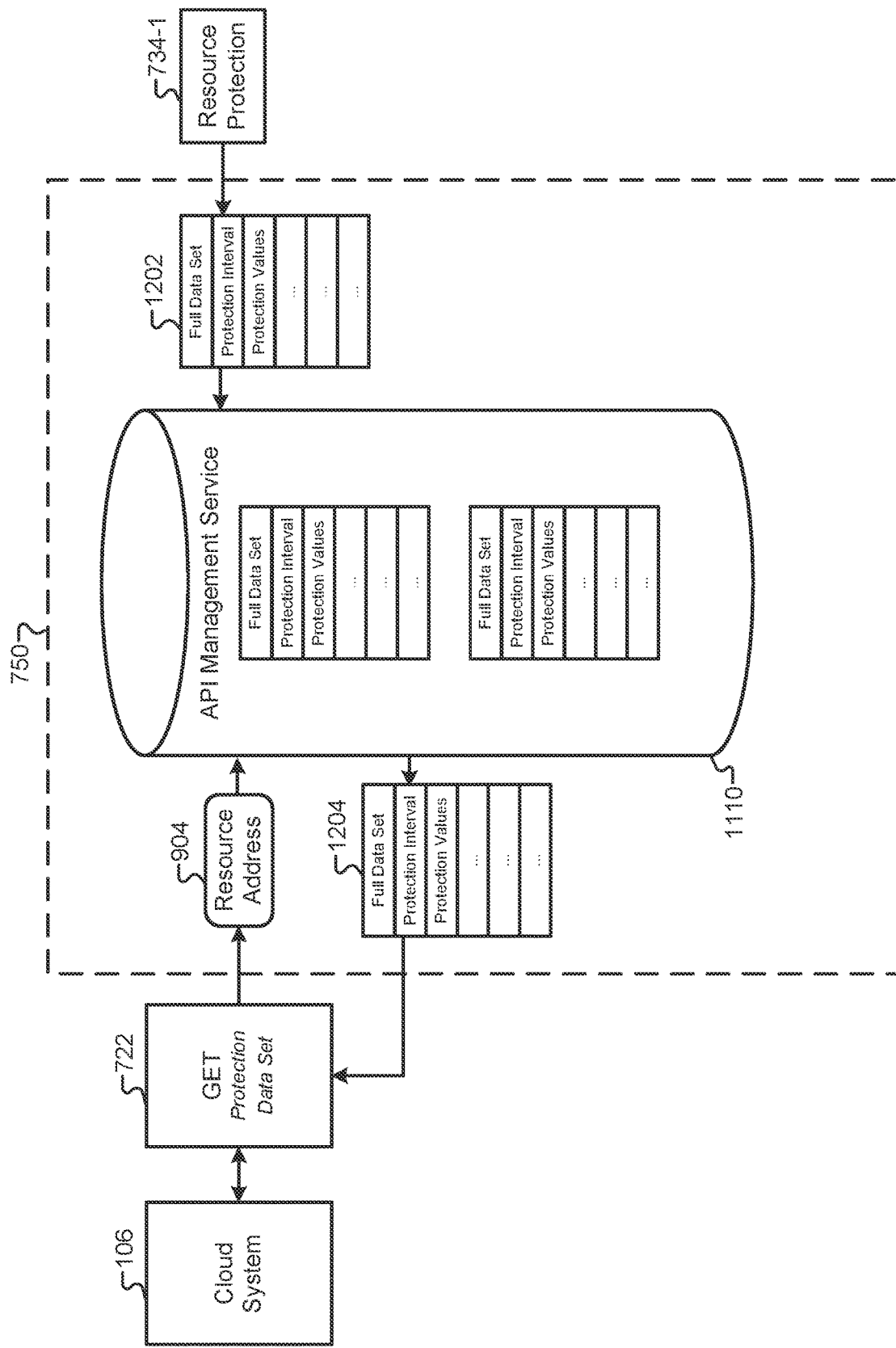
FIG. 12 illustrates a data flow diagram for requesting a full resource protection data set from a resource protection system, according to some embodiments.

FIG. 12 illustrates a data flow diagram for requesting a full resource protection data set from a resource protection system 734-1, according to some embodiments. The second GET command 722 can send a resource address 904 to the verification server 750. As described above, various software/hardware components in the verification server 750 can extract the resource address 904 from the request and send it to the API management service 1110. The API management service 1110 can post a request to a specific resource protection system 734-1 and retrieve a full resource protection data set 1202. The full resource protection data set 1202 may include all the information in the data subsets as described above, along with additional data values that describe a resource protection policy that is administered by the resource protection system 734-1. However, in some embodiments, the term "full resource protection data set" may not imply that all information stored at the resource protection systems are sent to the verification server. Instead, the full resource protection data set may simply include a subset of the data stored at the resource protection servers that is greater than the subset periodically uploaded to the verification server.

The verification server 750 can handle requests from various requesting systems and channel them to the appropriate resource protection systems 734. By acting as an intermediary, the verification server 750 can manage the different communication protocols with each of the resource protection systems 734. Instead of duplicating the APIs in the verification server 750 at each of the requesting systems, only a single server with those APIs needs to exist at the verification server 750. This effectively reduces the amount of processing and memory usage required by each of the requesting systems when this functionality is consolidated at the verification server 750.

In some embodiments, the API management service 1110 can manage a local data store that stores the full resource protection data sets as they are retrieved from the resource protection systems 734. If a request is received for a full resource protection data set that has previously been requested, the API management service 1110 can retrieve the previously stored full resource protection data set from the local data store and respond to the request without waiting for the delay that would otherwise be experienced by sending the request to the resource protection systems 734.

Figure 13:
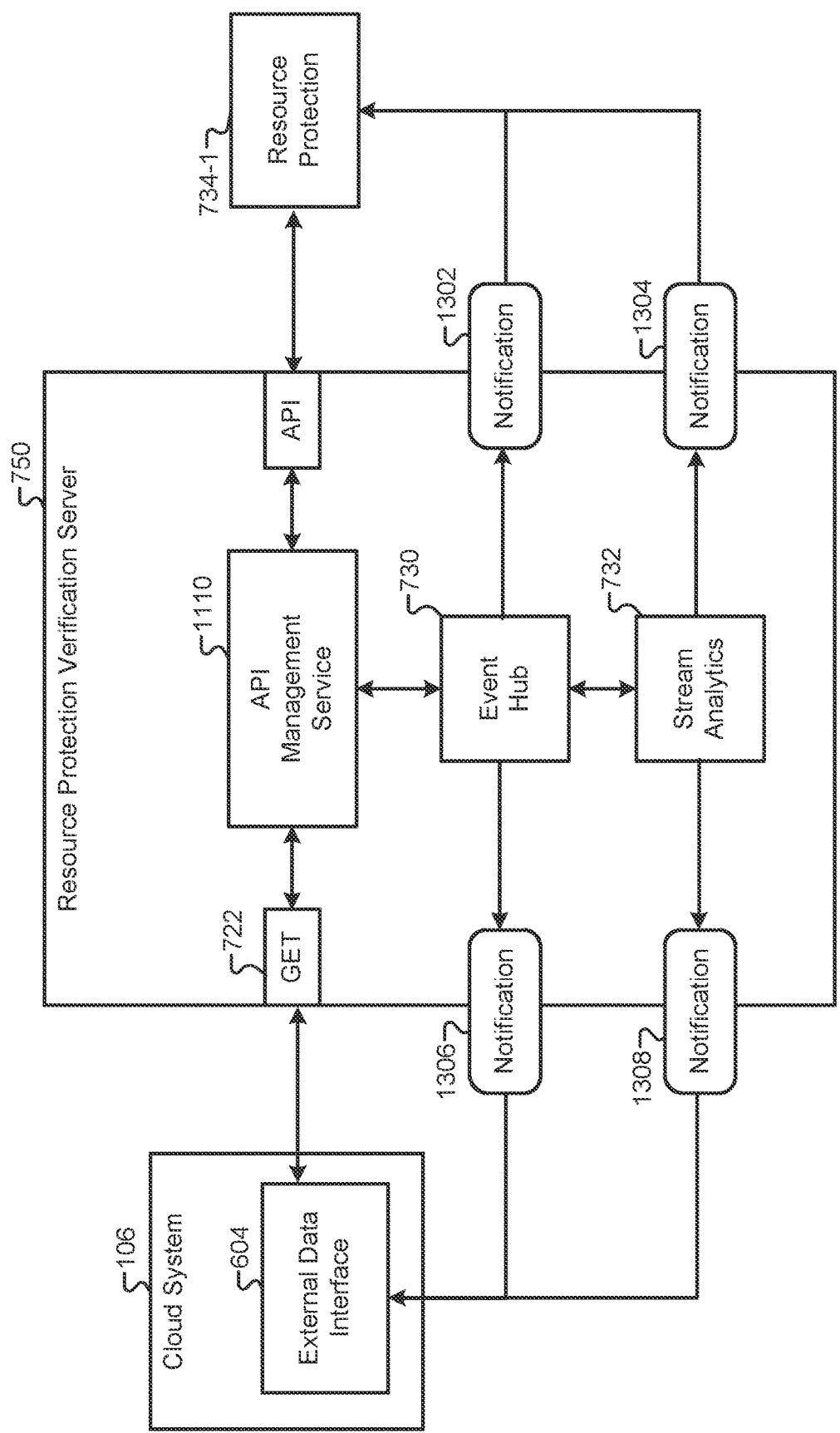
FIG. 13 illustrates a simplified system diagram for sending notifications to the resource protection systems and/or the requesting systems, according to some embodiments.

FIG. 13 illustrates a simplified system diagram for sending notifications to the resource protection systems 734 and/or the requesting systems, according to some embodiments. As described above, the verification server 750 may include an event hub 730 that triggers on certain data fields and/or conditions as they pass through the API management service 1110. As the full resource protection data sets pass through the API management service 1110, the event hub 730 can parse the 25-30 data fields in each full data set and capture specific values that can be compared to thresholds and other conditions to generate events and/or notifications. The notifications 1302, 1306 generated from the event hub 730 may be related to the specific resource protection data set passing through the API management service 1110.

In some embodiments, a notification 1302 may be sent to one or more resource protection systems 734. For example, some requests may indicate that the resource owner may be changing via the process executing at the requesting system. In the past, when resource ownership changed, the resource protection system providing a resource protection policy to the resource was likely to change as well. Because the verification server 750 is used as an intermediary to process these requests, it can determine by virtue of the request type that certain types of requests indicate a likelihood of a change in ownership of the resource. In response, the event hub 730 can send a notification 1302 to the resource protection system 734-1 currently protecting the resource. This may allow the resource protection system 734-1 to reach out independently to the new owner of the resource to continue to provide the resource protection policy for the resource.

In some embodiments, a notification 1306 may also be sent to the requesting system. For example, the event hub 730 can send a notification 1306 indicating a current resource protection system 734-1 administering a resource protection policy for the resource. This may be used by the owner of the resource to determine whether or not the resource protection policy provided by the resource protection system 734-1 should stay in force, or whether the resource owner should choose to select a new resource protection system. Additionally, some embodiments may allow the requesting system to directly make changes to the resource protection policy implement by the resource protection system. This option may be made available for currently subscribed or partnered resource protection systems. For example, the requesting system may change options in the resource protection policy, change values and/or validity dates associated with the resource protection policy, and/or make any other changes to how the resource is protected. Changes from the requesting system can generate automated actions that are passed on to the resource protection systems through the verification server.

In addition to analyzing individual communications by the event hub 730, the verification server 750 can also use the stream analytics module 732 to analyze a history of resource protection data sets as they pass through the API management service 1110. The stream analytics module 732 can identify trends, statistical outliers, and other information that can be useful to the resource protection systems and/or the requesting systems. The stream analytics module 732 can extract individual data fields from each resource protection data set and internally store averages, histograms, and/or other statistical characterizations of the population of resource protection data sets.

In some embodiments, the stream analytics module 732 can provide a notification 1304 to the resource protection system 734-1. The stream analytics module 732 can store and analyze data values from the full resource protection data sets as they pass through the verification server 750. From these data values, the stream analytics module 732 can generate statistical information that is descriptive of the population of full resource protection data sets uploaded to the verification server 750. Individual values that are passed through the API management service 1110 can be compared to a history, average, or other statistical characterization of the population of full resource protection data sets to provide feedback to the resource protection systems 734 and/or requesting systems to optimize the match between a particular resource and a resource protection system.

In some embodiments, the stream analytics module 732 can generate a notification 1304 that compares data values in a current full resource protection data set to average data values for similar resources that have been seen in the past by the API management service 1110. For example, if a current data value from a resource protection system 734-1 is significantly higher/lower than a corresponding data value received from other resource protection systems for similar resources, the notification 1304 can be sent to alert the resource protection system 734-1 that its data value is significantly higher/lower than other resource protection systems.

In some embodiments, the notification 1304 generated by the stream analytics module 732 may include heat maps or other statistical characterizations of the population of data sets. These can be used by the resource protection systems 734 to identify groups of resources (e.g., resource address ranges, resource types, resources of certain sizes, etc.) that are either overserved or underserved by a particular resource protection system. This information can be used by the resource protection systems to contact resource owners and to identify ways that the resources can be protected by the resource protection systems.

In some embodiments, the stream analytics module 732 can also send a notification 1308 to the requesting system. The notification 1308 can generate a comparison of different data values associated with different resource protection systems. These data values can be used as a comparison to evaluate a current data value for a resource protection policy being enforced by a current resource protection system 734-1. Some embodiments may also send recommendations of resource protection systems to the requesting system. These recommendations may be based on a comparison of data values, and/or a prioritized list of preferred resource protection systems maintained by the verification server 750.

Figure 14:
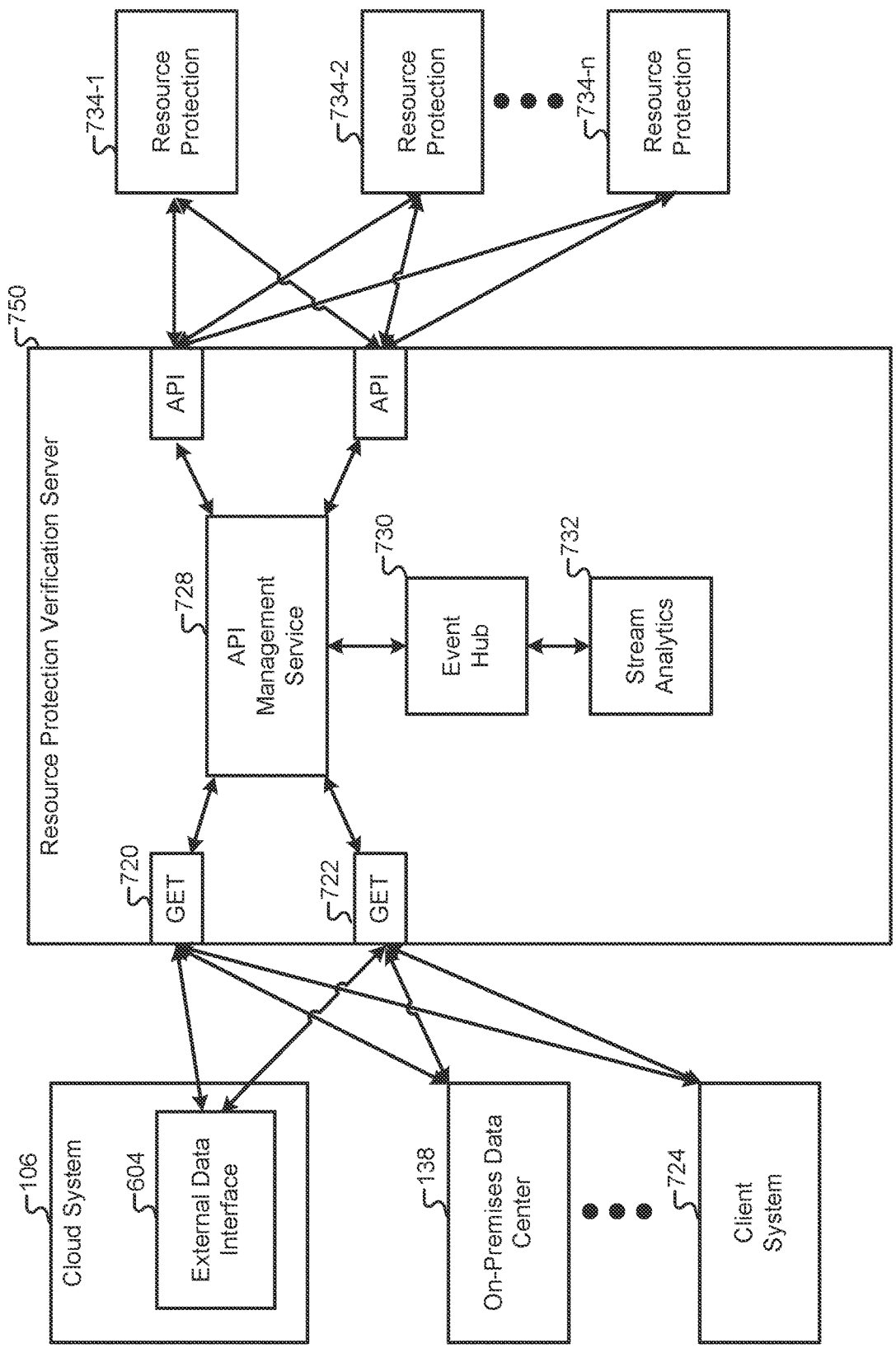
FIG. 14 illustrates an alternate architecture diagram of a resource protection verification server interacting with the plurality of requesting systems and the plurality of resource protection systems, according to some embodiments.

FIG. 14 illustrates an alternate architecture diagram of a resource protection verification server 750 interacting with the plurality of requesting systems 106, 138, 724 and the plurality of resource protection systems 734, according to some embodiments. This alternate architecture is similar to the architecture illustrated in FIG. 7. However, in contrast to FIG. 7, this alternate architecture eliminates the need to store any personal identifying information from any of the requesting systems at the resource protection verification server 750. Instead of receiving periodic uploads of information from the resource protection systems 734, the resource protection verification server 750 can act as an intermediate server to service requests between the various requesting systems 106, 138, 724 and the resource protection systems 734 in real time. This eliminates the overhead that can be associated with storing personal information for users of the requesting systems. This also eliminates the need to store any data subsets describing resource protection statuses at the resource protection verification server 750. Instead, the resource protection verification server 750 can translate single requests from the requesting systems to simultaneously or serially check for resource protection at any number of resource protection systems 734.

For example, when an initial request to verify resource protection is received through the web interface 720, the API management service 728 can receive the request from the requesting system. As described above, the request may include identifying information for a user associated with the requesting system, as well as an address for the resource in question. In a general sense, any of the requesting systems 106, 138, 724 may be simply referred to as "client devices" in this disclosure. The API management service 728 can receive, for example, a single request or multiple requests from the cloud system 106 to verify resource protection of one or more particular resources.

The API management service 728 may next identify the resource protection systems 734 that are in communication with the resource protection verification server 720 and available for servicing requests. Although the resource protection systems 734 need not provide periodic uploads of data subsets to the resource protection verification server 750, the resource protection systems 734 may still register, subscribe, or otherwise partner with the resource protection verification server 750. This allows the resource protection verification server 750 to maintain a list of approved, subscribed, or otherwise available resource protection systems 734. Alternatively, the API management service 728 may discover available resource protection systems 734 and dynamically remove or add them to a list of available resource protection systems such that the resource protection verification server 750 provides the most up-to-date listing of available resource protection services for requesting client devices. Some embodiments may alternatively or additionally receive approved lists of resource protection systems from an administrator and/or from an external service.

After determining a plurality of resource protection systems 734 that are available, the API management service 728 may further identify a subset of the resource protection systems 734 that should be queried to service the current request. The resource protection verification server 750 may use attributes of the current request to select the subset of the resource protection systems 734 to service that request. For example, the API management service 728 may select a subset of resource protection systems 734 that can be associated with an address of the resource. The API management service 728 may maintain or receive address ranges that can be used to match resource addresses with available resource protection systems. For example, an address within a particular address range may be associated with a subset of resource protection systems known to be available in that address range.

In some embodiments, the subset of available resource protection systems 734 may be identified using a load-balancing system such that outgoing requests may be predictably distributed between the resource protection systems 734. This may be useful to ensure that hundreds of requests can be serviced by the resource protection verification server 750 without overloading any single resource protection system. The load-balancing system may use a round-robin algorithm to distribute requests to the resource protection systems. Other embodiments may choose resource protection systems that are known to provide resource protection for the greatest number of resources to be tried first, followed by smaller resource protection systems that are less likely to provide resource protection for some resources.

The API management service 728 may then format or reformat the request such that it complies with an expected format for each of the subset of selected resource protection systems. Some resource protection systems may comply with a predetermined API format. For example, the resource protection verification server 750 may publish or otherwise make available an API format that may be expected to be used with participating resource protection systems 734. The API management service 728 can identify all such resource protection systems in the selected subset and format a single request that can be sent to each complaint API interface. In some cases, resource protection systems may already have an established API interface that does not comply with the standard API requested by the resource protection verification server 750. In these cases, a custom code module may be implemented in the API management service 728 that translates the format of the request into an expected format for each custom API as required. These format translations may depend primarily on the expected format of the published API of the resource protection system.

The API management service 728 can then send requests serially or in parallel to the subset of resource protection systems 734 to service the request. Although the response latency of each particular resource protection system may vary, the API management service 728 can begin evaluating responses as soon as they are received. For example, the API management service 728 may begin receiving responses from the resource protection systems indicating whether or not the identified resource in the request is protected by these resource protection systems. As soon as an affirmative response is received by the API management service 728, it can transmit that response back to the requesting client system. Some embodiments may continue receiving responses from the resource protection systems to identify additional positive responses. These additional positive responses can then be transmitted back to the requesting client device as they are received or together in a single response. This covers cases where a selected resource is protected by a plurality of different resource protection systems. Additionally, if none of the responses are affirmative, the API management service 728 may query additional resource protection systems until the list of available resource protection systems 734 is exhausted and/or an affirmative response is found.

The operations described above in relation to FIG. 13 may continue to be carried out by the event hub 730 and/or the stream analytics 732. Additionally, these systems may also provide additional services that are related to the resource protection verification request. As described above, some instances may occur where the resource identified in the request is not protected by any of the resource protection systems 734. The resource protection verification request is often part of a larger data transaction that requires resource protection to be verified for the resource. For example, certain processes may not be allowed to proceed unless resource protection is verified. In cases where resource protection cannot be verified, the data transaction may be allowed to continue if resource protection can be established. The event hub 730 and/or stream analytics 732 may aid in this process.

In some embodiments, the API management service 728 may send a response to the requesting client device indicating that no resource protection could be verified. This response may also include an option to request resource protection. FIG. 15 illustrates an interface 1500 that may be generated on the client device for requesting resource protection when it cannot be verified, according to some embodiments. In some embodiments, the interface 1500 can be provided by the resource protection verification server 750 for display on the client device, such as a webpage displayed on a client web browser. The interface 1500 may include a listing of identifiers 1502 for the resource protection systems 734 and/or additional values 1504 associated with each resource protection system.

In this embodiment, the listing of identifiers 1502 may include server addresses for each of the recommended resource protection systems 734. In other embodiments, other identifiers may be used. For example, some embodiments may use a trademark or tradename for a company operating the resource protection system. The additional values 1504 may include any method of distinguishing between resource protection systems. This may include a rating, a cost, a protection time interval, details that describe the protection provided by the resource protection system, and so forth. These additional values 1504 may be displayed next to the identifiers 1502 such that they can be visibly compared by a user of the client device. In this example, only a single additional value is displayed in the listing of additional values 1504. This is illustrated merely by way of example, and is not meant to be limiting. Other embodiments may list a plurality of such additional values 1504 in additional columns for each of the identifiers 1502.

In some embodiments, the API management service 728 can rank resource protection systems according to a predetermined priority listing. For example, a first resource protection system 734-1 may fulfill certain criteria established by the resource protection verification server 750 and thus be assigned a high priority listing. This criteria may include factors such as a protection rating, a protection effectiveness, user ratings, an availability rating, compliance with a standard API format, latency or response time, cost to the client device and/or the resource protection verification server 750, and so forth. In some embodiments, the criteria may include a subscription or membership level at which the particular resource protection systems are associated with the resource protection verification server 750.

Note that the way resource protection systems are ranked by the resource protection verification server 750 can be configured to ensure fairness to each of the resource protection systems and to the users of the client devices. For example, the resource protection verification server 750 can be configured to rank resource protection systems without regard to any benefit received by the resource protection verification server 750, such as payments, number of transactions, number of resources protected, or other benefits provided by the resource protection systems. Thus, the ranking system described above is completely optional and not be implemented in some embodiments according to agreements between the resource protection verification server 750 and the resource protection systems.

The list of identifiers 1502 for the resource protection verification systems in the interface 1500 of FIG. 15 may be displayed according to the ranking system described above. For example, resource protection systems that are ranked highly may be displayed first in the list of identifiers 1502. Other visual indications may be applied to the list of identifiers 1502 to indicate the ranking or preference of certain resource protection systems. For example, additional graphics, such as stars or highlights, may be added to preferred resource protection systems. As illustrated in FIG. 15, resource protection systems near the top of the list may be presented in bold, underline, or varying colors to emphasize their display. Some embodiments may display additional information for highly ranked resource protection systems.

In some embodiments, the interface 1500 may also be provided in cases where protection is found, if the existing resource protection is determined to be better performed by other resource protection systems. For example, if the protection provided by a current resource protection system is found to be more costly or less effective than a resource protection protocol that could be provided by other resource protection systems, the resource protection verification server 750 can provide an indication that resource protection was verified along with a version of interface 1500 that allows the user to be presented with alternative options for resource protection.

Figure 16:
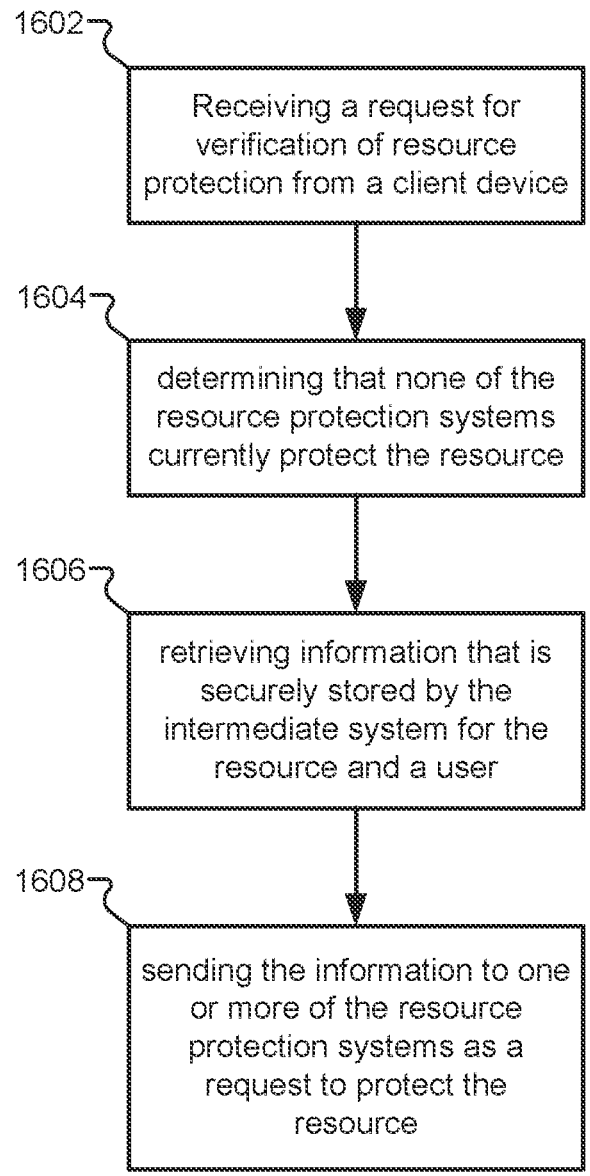
FIG. 16 illustrates a flowchart of a method for verifying resource protection statuses and requesting resource protection, according to some embodiments.

The interface 1500 may allow the user to select one of the presented identifiers 1502 and thereby proceed to submit a request to the associated resource protection system for resource protection. FIG. 16 illustrates a flowchart of a method for verifying resource protection statuses and requesting resource protection, according to some embodiments. The method may include receiving a request for verification of resource protection from a client device for an address-based resource (1602). The request may include an address of the resource. The request may be received by an intermediate system that is programmed to receive resource protection verification requests for a plurality of client devices. The intermediate system may include the resource protection verification server described above. The intermediate system may act as an intermediary to decouple requests from client devices from requests sent to the plurality of resource protection systems, thereby acting as a "clearing-house" or middleman between the client devices and the resource protection systems. The resource protection systems may include web services or servers associated with homeowners insurance companies.

The method may also include determining that none of the resource protection systems in the plurality resource protection systems currently protect the resource (1604). In some embodiments, this may include accessing a database of data subsets that have been periodically provided by the resource protection systems without making any additional requests to the resource protection systems. In other embodiments, this may include sending requests to one or more resource protection systems to determine whether any of the resource protection systems provide resource protection. If no affirmative responses are received from the resource protection systems, or no data subset is available in the database, then an indication may be sent to the client device indicating that the resource is currently unprotected. In some embodiments, an indication may then be received back from the client device that protection for the resource should be requested. As described above, the indication that the client device is currently unprotected may include a list of one or more resource protection systems that are eligible to provide resource protection, and the list may be organized or presented according to a priority level for each resource protection system. The priority level may be determined based on the factors described above, such as a preference indicated by the user (e.g., cost, effectiveness rating, and so forth).

The method may also include retrieving information that is securely stored by the intermediate system for the resource and/or a user associated with the request (1606). This information may include a user's name, home address, mailing address, credit information, income and/or asset information, personal identifiers such as a birthdate and Social Security number, and other information that would be used in an application to provide resource protection. This information may also include information about the resource, such as a physical address, and characteristics resource, such as square footage, cost, value, age, and so forth. In a general sense, this information may include any information that is descriptive of a user and/or the resource.

This information may be stored separately from the intermediate system. For example, referring back to FIG. 14, the cloud system 106 may be associated with another data transaction involving the user. This data transaction may include aggregating, collecting, storing, and/or verifying information regarding the user and/or the resource. The intermediate system can leverage this information provided by the cloud system 106 to automatically populate fields in a request to provide resource protection from one or more resource protection systems 734. For example, the resource protection systems may provide a web service input or web form input that can receive user and/or resource information as an online request for resource protection. The intermediate system in these embodiments can simplify this process for the user by automatically importing this information from the cloud system 106 and using that information to automatically populate the web form or web service request to be sent to the resource protection system(s) 734. Thus, the method may also include sending the information for the resource and/or user to one or more of the plurality of resource protection systems as a request to protect the resource (1608).

It should be appreciated that the specific steps illustrated in FIG. 16 provide particular methods of verifying resource protection according to various embodiments. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
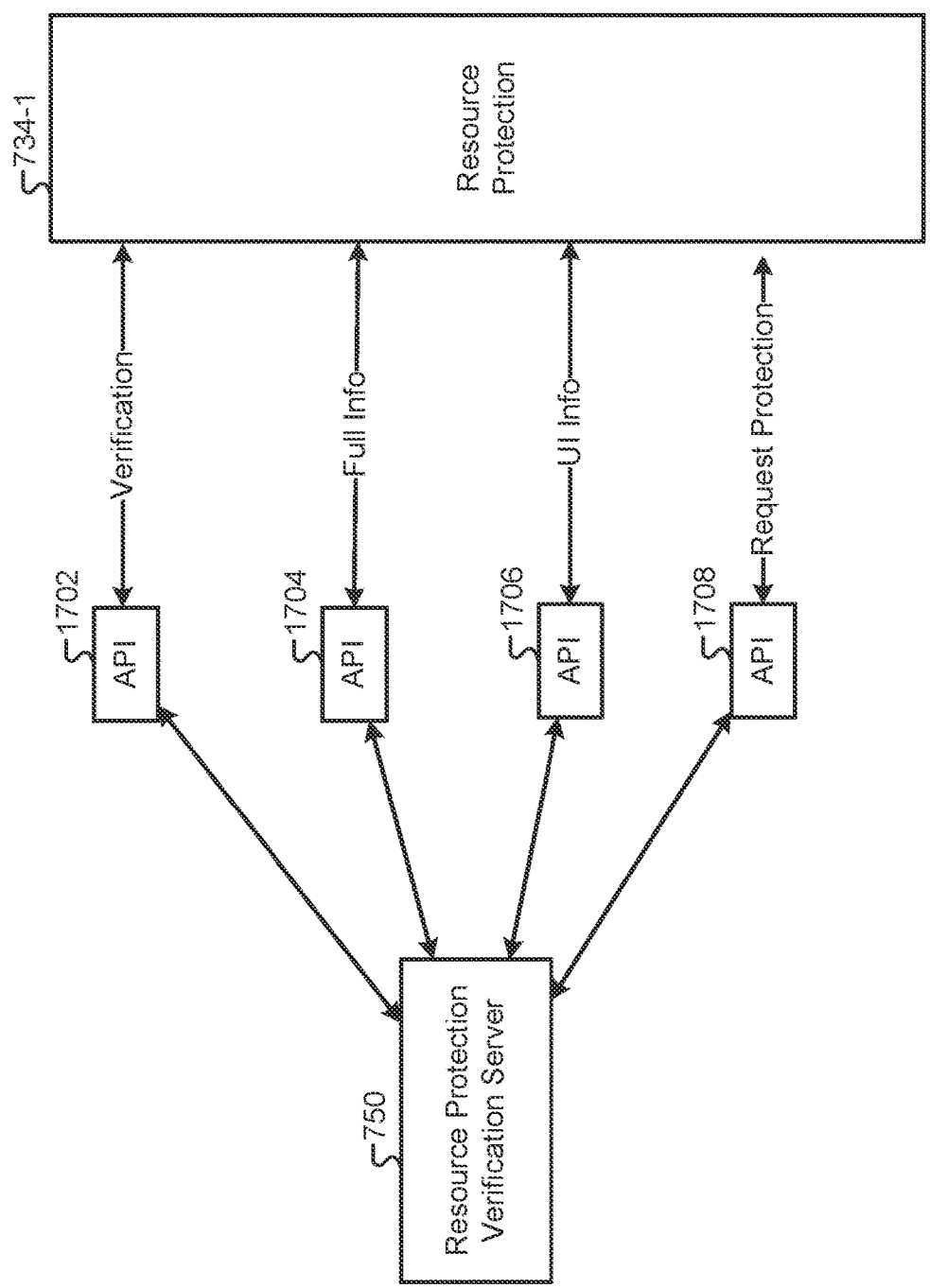
FIG. 17 illustrates an interface diagram for various API calls that may be used between the resource protection verification server and the resource protection systems.

FIG. 17 illustrates an interface diagram for various API calls that may be used between the resource protection verification server 750 and the resource protection systems 734. As described above, the transactions for verifying and requesting resource protection may be part of a larger set of data transactions that can each be carried out through specific API calls to the resource protection system 734-1. A first API 1702 can be used to verify resource protection. The first API 1702 may receive a user name and/or an address for the resource and return an indication of whether resource protection is currently in force, as well as a protection start date, protection interval, and other values associated with the resource protection.

A second API 1704 can be used to receive a full set of resource protection data. The resource protection server 750 can provide a user name and an address, as well as an address for the resource. In some embodiments, the second API 1704 may also receive an identification number for the resource protection file. In response, the second API 1704 may return a full, complete, and/or extensive data set that describes the entirety of the resource protection protocol assigned to that particular resource. This data set may be formatted as an XML file, PDF file, a JSON object, and/or the like.

A third API 1706 may be used to request user interface information from the resource protection system 734-1. As described above, the resource protection verification server 750 may provide a user interface to the client device that displays a list of resource protection systems, as well as an option to request resource protection from a particular system. Each system may provide unique user interface information to be displayed as part of the user interface presented to the user. For example, some embodiments may receive a text string from the resource protection system 734-1 that should be displayed next to a tradename of the resource protection system 734-1 in the user interface for the user. This allows the resource protection system 734-1 to customize its message for the user. The text string may include information regarding length, cost, and other options available for the resource protection offered by the resource protection system 734-1.

The third API 1706 may receive a plurality of data points from the resource protection verification server 750 before providing the user interface information. For example, the third API 1706 may receive a type of resource protection protocol being requested, as well as location codes. This information allows the resource protection system 734-1 to determine whether resource protection can be provided in the requested location and consistent with the resource protection protocol type being requested before providing a response. This also allows the resource protection system 734-1 to tailor and otherwise customize any user interface information that will be displayed to the user.

A fourth API 1708 may be used to submit a formal request for resource protection to the resource protection system 734-1. The resource protection verification server 750 can submit an extensive set of user data and information descriptive of the resource to the resource protection system 734-1 as described below, this information may be received from the user or extracted from a secure data store and/or other third-party verification services. This information may be retrieved automatically without requiring responsive user inputs. The resource protection system 734-1 can then return a customized URL that can be used to complete the resource protection request.

Figure 18:
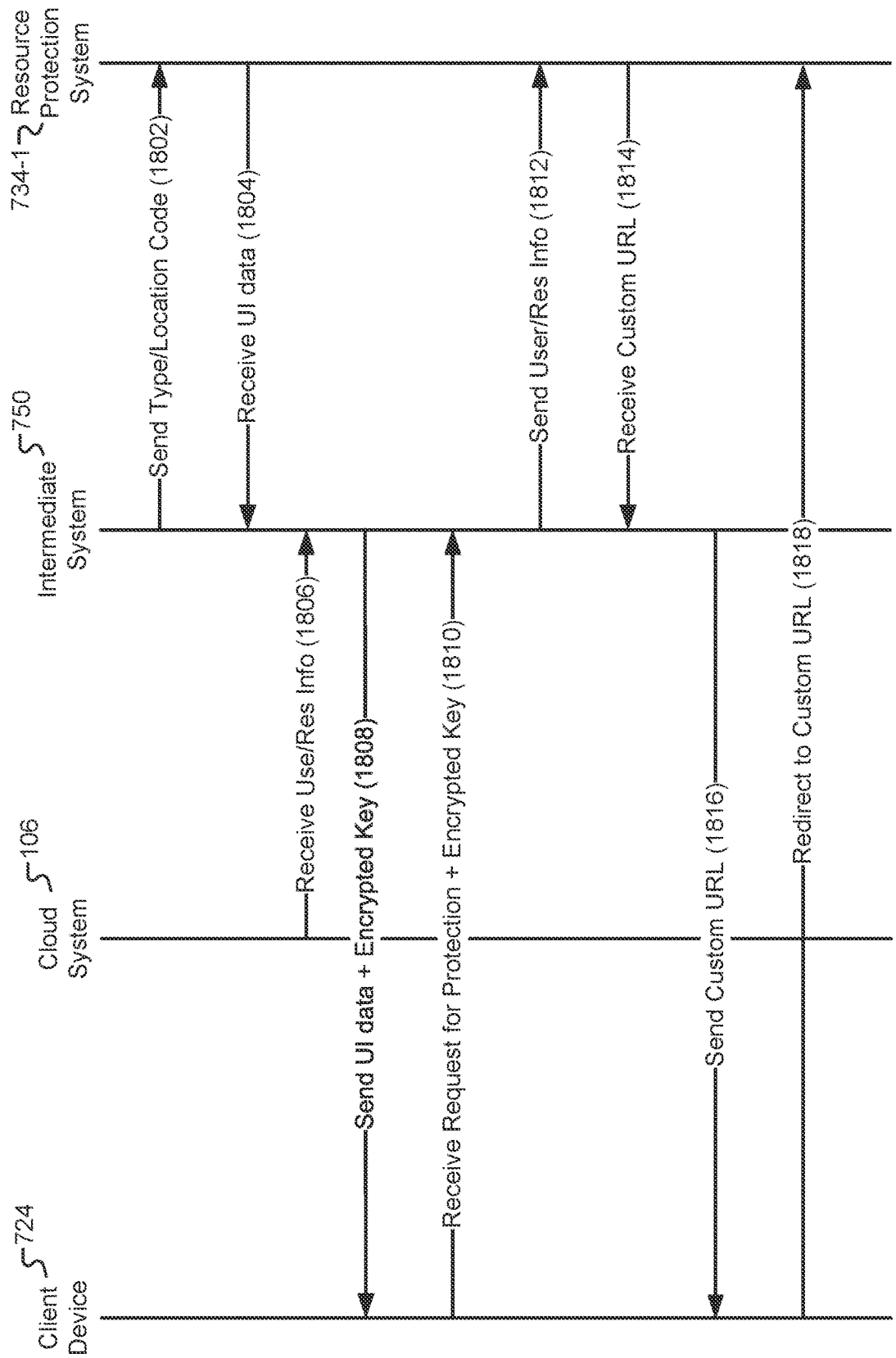
FIG. 18 illustrates a data flow diagram that for transmissions during a resource protection request, according to some embodiments.

FIG. 18 illustrates a data flow diagram that for transmissions during a resource protection request, according to some embodiments. These transmissions may take place after it is determined that no resource protection is currently in force for the selected resource. The intermediate system 750 may send the resource protection protocol type and one or more location codes to the resource protection system 734 through the third API 1706 described above (1802). In response, the resource protection system 734-1 can send user interface data to the intermediate system 750 if the resource protection system 734-1 determines that it can provide the requested resource protection protocol (1804).

After receiving user interface data, the intermediate system 750 can collect information that is descriptive of the user (name, address, identifying numbers, birth date, and so forth), and/or information that is descriptive of the resource (address, size, value, year, and so forth). This information may be retrieved from the cloud system 106, where such information is securely stored and not typically available to the intermediate system 750 (1806). This information may be encrypted into an encrypted key and sent to the client device 724 along with the user interface data (1808).

As described above in relation to FIG. 15, the user interface on the client device 724 may display the identifiers for various resource protection systems 734, along with user interface information. In response, the user may select a particular resource protection system 734-1 and request resource protection. In response, the client device 724 may send the request for resource protection along with the encrypted key back to the intermediate system 750 (1810). The intermediate system can then decrypt the encrypted key and package the information from the encrypted key into a transmission for the resource protection system 734-1. The information in the encrypted key may include the personal/resource information that may be required by the resource protection system 734-1 as part of a request to provide resource protection for the particular resource. By sending the encrypted key back to the client device 724, the intermediate system 750 does not need to store the encrypted key or any personal identifying information or resource-specific information at the intermediate system 750.

The resource protection system 734-1 may receive the data set from the intermediate system 750 and use that data set to populate a web form. The resource protection system 734-1 can then send a custom URL to the intermediate system 750 (1814), where it can be forwarded to the client device 724 (1816). The custom URL can then redirect the browser of the client device 724 to the resource protection system 734-1. Once opened, the URL will display a web form that is already pre-populated with the information from the encrypted key. The user can then accept the information and submit the formal request/application for resource protection.

Data Center Computer System

Figure 19:
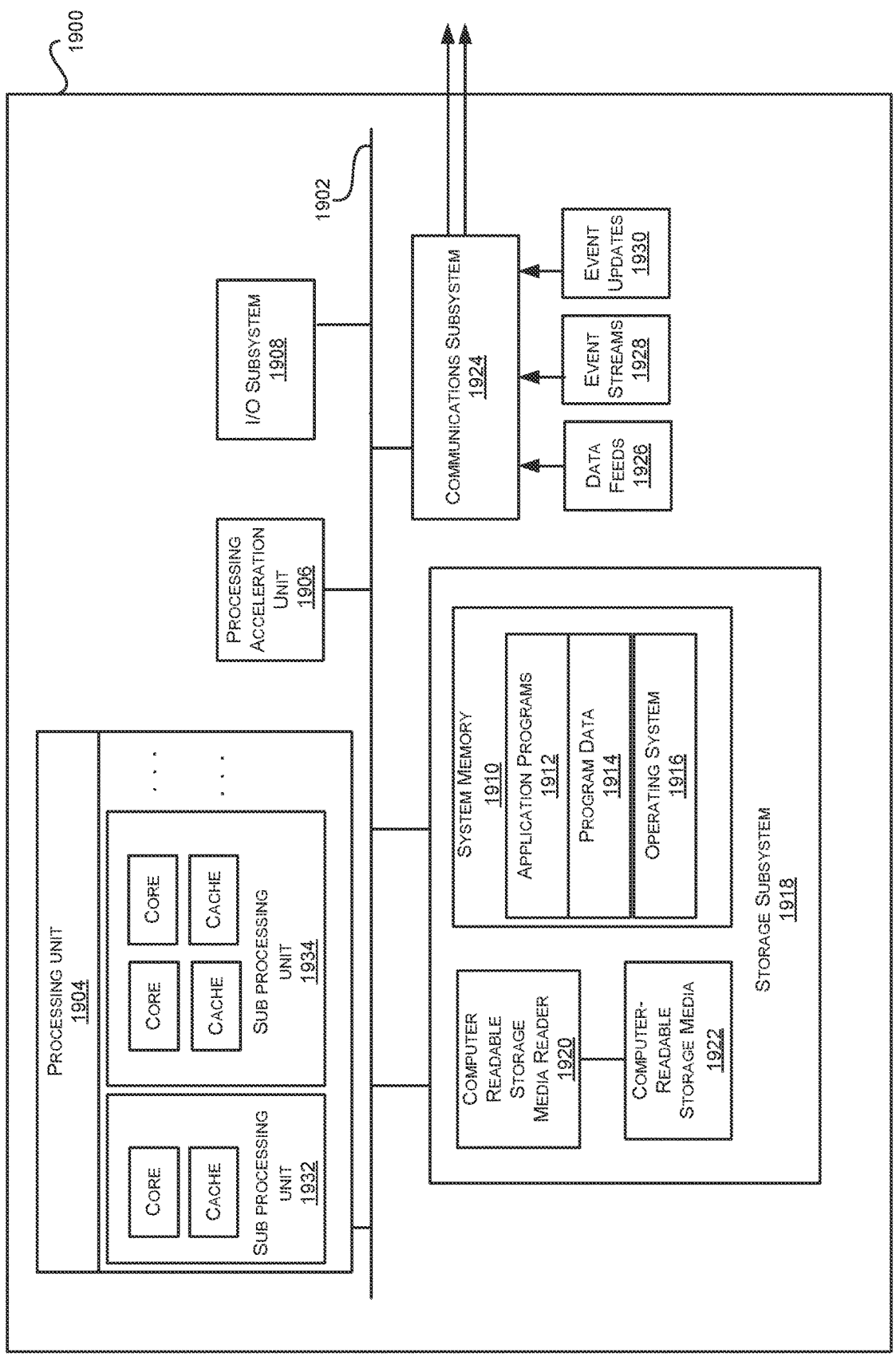
FIG. 19 illustrates an exemplary computer system, in which various embodiments may be implemented.

FIG. 19 illustrates data center computer system 1900 that may be used to implement any of the systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1918 may also provide a tangible computer-readable storage medium for storing the basic programming and data constructs that provide the functionality of some embodiments. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present invention.

Storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of verifying resource protection statuses for resources for address-based resources, the method comprising:
   receiving, by an intermediate system, a request for verification of resource protection from a client device for an address-based resource, wherein:
      the request comprises an address of a resource;
      the intermediate system is programmed to receive resource protection verification requests from a plurality of client devices, and to receive resource protection verifications from a plurality of resource protection systems that are in communication with the intermediate system;
   determining, by the intermediate system, that none of the resource protection systems in the plurality of resource protection systems currently protect the resource;
   retrieving, by the intermediate system, information that is securely stored for the resource and a user associated with the request;
   sending, by the intermediate system, the information to one or more of the plurality of resource protection systems as a request to protect the resource; and
   extracting, by a stream analytics module of the intermediate system, individual data fields from the request for a history of resource protection data sets that pass through the intermediate system.

2. The method of claim 1, wherein the intermediate system acts as an intermediary to decouple requests from client devices from requests sent to the plurality of resource protection systems.

3. The method of claim 1, wherein the intermediate system comprises a cloud-based system that operates on hardware and software that is different from any of the plurality of resource protection systems.

4. The method of claim 1, wherein the address of the resource comprises a physical location of the resource.

5. The method of claim 1, further comprising:
   sending, by the intermediate system, an indication to the client device that the resource is currently unprotected; and
   receiving, by the intermediate system, an indication from the client device that protection for the resource should be requested.

6. The method of claim 5, wherein the indication from the client device that the resource is currently unprotected comprises a list of one or more resource protection systems from the plurality of resource protection systems.

7. The method of claim 6, wherein an order of the list of one or more resource protection systems is determined based on a predetermined priority level for each of the one or more resource protection systems.

8. The method of claim 6, wherein an order of the list of one or more resource protection systems is determined based on a preference indicated by the user.

9. The method of claim 1, further comprising:
   receiving, by the intermediate system, a second request for verification of resource protection from a second client device for a second address-based resource;
   determining, by the intermediate system, that one or more of the resource protection systems in the plurality of resource protection systems currently protect the resource; and
   sending a transmission to the one or more of the resource protection systems indicating that the resource is being transferred to the user from a previous user.

10. The method of claim 1, wherein information that is securely stored by the intermediate system comprises contact information for the user and the address of the resource.

11. A system comprising:
    one or more processors; and
    one or more memory devices comprising instructions that, when executed by the one or more processors, cause the one or more processors to perform operations comprising:
       receiving, at an intermediate system, a request for verification of resource protection from a client device for an address-based resource, wherein:
          the request comprises an address of a resource;
          the intermediate system is programmed to receive resource protection verification requests from a plurality of client devices, and to receive resource protection verifications from a plurality of resource protection systems that are in communication with the intermediate system;
       determining, by the intermediate system, that none of the resource protection systems in the plurality of resource protection systems currently protect the resource;
       retrieving, by the intermediate system, information that is securely stored by the intermediate system for the resource and a user associated with the request;
       sending, by the intermediate system, the information to one or more of the plurality of resource protection systems as a request to protect the resource; and
       extracting, by a stream analytics module of the intermediate system, individual data fields from the request for a history of resource protection data sets that pass through the intermediate system.

12. The system of claim 11, wherein the operations further comprise:
    authorizing, by the intermediate system, the plurality of resource protection systems that provide protection for a plurality of different resources to provide periodic uploads to the intermediate system;
    receiving, by the intermediate system, periodic uploads of information associated with protected resources from the plurality of resource protection systems, wherein the information associated with the protected resources comprises data subsets of full data sets stored at the plurality of resource protection systems; and
    storing the data subsets in a database at the intermediate system.

13. The system of claim 12, wherein determining, by the intermediate system, that none of the resource protection systems in the plurality of resource protection systems currently protect the resource comprises:
    using the address of the resource, querying the database for a data subset associated with protection of the resource.

14. The system of claim 11, wherein the operations further comprise:
    receiving an estimate of a data value for resource protection from one or more resource protection systems in the plurality of resource protection systems; and
    sending the estimate of the data value to the client device.

15. The system of claim 11, wherein the operations further comprise:

generating an estimate of a data value for resource protection, wherein the estimate is based at least in part on data values received from the resource protection systems; and sending the estimate of the data value to the client device.

16. The system of claim 11, wherein the operations further comprise sending a second request based on the request for verification of resource protection to a subset of the plurality of resource protection systems, wherein the second request is sent in response to receiving the request for verification of resource protection.

17. The system of claim 15, wherein the operations further comprise reformatting the request for verification of resource protection into a standard format for an API used by the plurality of resource protection systems and specified by the intermediate system.

18. The system of claim 11, wherein an indication of resource protection received from one of the plurality of resource protection systems comprises:

a protection start time; and a protection interval.

19. The system of claim 11, wherein the information that is securely stored by the intermediate system for the resource and the user associated with the request is used to populate a form.

20. A non-transitory, computer-readable medium comprising instructions that, when executed by one or more processors, cause the one or more processors to perform operations comprising:

receiving, at an intermediate system, a request for verification of resource protection from a client device for an address-based resource, wherein:

the request comprises an address of a resource;

the intermediate system is programmed to receive resource protection verification requests from a plurality of client devices, and to receive resource protection verifications from a plurality of resource protection systems that are in communication with the intermediate system;

determining, by the intermediate system, that none of the resource protection systems in the plurality of resource protection systems currently protect the resource;

retrieving, by the intermediate system, information that is securely stored by the intermediate system for the resource and a user associated with the request;

sending, by the intermediate system, the information to one or more of the plurality of resource protection systems as a request to protect the resource; and extracting, by a stream analytics module of the intermediate system, individual data fields from the request for a history of resource protection data sets that pass through the intermediate system.

* * * * *